United States Patent
Seo

(10) Patent No.: US 7,302,172 B2
(45) Date of Patent: Nov. 27, 2007

(54) ANTI-SHAKE APPARATUS

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 391 days.

(21) Appl. No.: 11/140,966

(22) Filed: Jun. 1, 2005

(65) Prior Publication Data

US 2005/0276589 A1 Dec. 15, 2005

(30) Foreign Application Priority Data

Jun. 10, 2004 (JP) .......................... P2004-172314

(51) Int. Cl.
*G03B 17/00* (2006.01)
(52) U.S. Cl. ...................................... 396/55
(58) Field of Classification Search ................. 396/52, 396/55; 348/208.4, 208.5, 208.99
See application file for complete search history.

(56) References Cited

U.S. PATENT DOCUMENTS

| 6,408,135 | B1 * | 6/2002 | Imada .................... | 396/55 |
| 2003/0067544 | A1 | 4/2003 | Wada | |
| 2004/0022530 | A1 * | 2/2004 | Okazaki et al. ............ | 396/55 |

FOREIGN PATENT DOCUMENTS

| JP | 63-099680 | 4/1988 |
| JP | 10-142649 | 5/1998 |
| JP | 11-072815 | 3/1999 |
| JP | 2001-117129 | 4/2001 |
| JP | 2002-229090 | 8/2002 |
| JP | 2003-110919 | 4/2003 |

OTHER PUBLICATIONS

English language Abstract of JP 10-142629, May 29, 1998.
English language Abstract of JP 11-072815, Mar. 16, 1999.
English language Abstract of JP 2001-117129, Apr. 27, 2001.
English language Abstract of JP 2002-229090, Aug. 14, 2002.
English language Abstract of JP 2003-110919, Apr. 11, 2003.
U.S. Appl. No. 11/044,010 to Uenaka et al., which was filed on Jan. 28, 2005.
U.S. Appl. No. 11/044,055 to Uenaka et al., which was filed on Jan. 28, 2005.

(Continued)

*Primary Examiner*—W. B. Perkey
*Assistant Examiner*—Nia Cook
(74) *Attorney, Agent, or Firm*—Greenblum & Bernstein, P.L.C.

(57) ABSTRACT

An anti-shake apparatus of a photographing apparatus comprises a movable unit and a fixed unit. The movable unit has an imaging device and can be moved and rotated on a plane which is perpendicular to an optical axis of a camera lens of the photographing apparatus. The fixed unit supports the movable unit in a movable and rotatable situation on the plane. The movable unit and the fixed unit have a position-detecting apparatus that detects first position-information of the movable unit in a first direction being perpendicular to the optical axis. The is fixed unit has an optical sensor unit that has two position-detecting elements which are used for detecting the first position-information as the position-detecting apparatus. The movable unit has a slit light-source unit that has two slit light-sources which are used for detecting the first position-information as the position-detecting apparatus.

13 Claims, 10 Drawing Sheets

OTHER PUBLICATIONS

U.S. Appl. No. 11/044,054 to Uenaka, which was filed on Jan. 28, 2005.
U.S. Appl. No. 11/065,577 to Uenaka, which was filed on Feb. 25, 2005.
U.S. Appl. No. 11/065,354 to Uenaka et al., which was filed on Feb. 25, 2005.
U.S. Appl. No. 11/073,638 to Uenaka et al., which was filed on Mar. 8, 2005.
U.S. Appl. No. 11/073,604 to Uenaka, which was filed on Mar. 8, 200.
U.S. Appl. No. 11/071,234 to Uenaka, which was filed on Mar. 4, 2005.
U.S. Appl. No. 11/071,220 to Uenaka et al., which was filed on Mar. 4, 2005.
U.S. Appl. No. 11/071,241 to Uenaka, which was filed on Mar. 4, 2005.
U.S. Appl. No. 11/071,242 to Uenaka, which was filed on Mar. 4, 2005.
U.S. Appl. No. 11/078,367 to Seo, which was filed on Mar. 14, 2005.
U.S. Appl. No. 11/108,868 to Uenaka et al., which was filed on Apr. 19, 2005.
U.S. Appl. No. 11/115,315 to Seo, which was filed on Apr. 27, 2005.
U.S. Appl. No. 11/140,731 to Seo, which was filed on Jun. 1, 2005.
U.S. Appl. No. 11/159,156 to Ogawa et al., which was filed on Jun. 23, 2005.

* cited by examiner

ANTI-SHAKE APPARATUS

BACKGROUND OF THE INVENTION

1. Field of the Invention

The present invention relates to an anti-shake apparatus for a photographing device (apparatus), and in particular to a position-detecting apparatus for a movable unit that includes the imaging device etc., and that can be moved for correcting the hand-shake effect.

2. Description of the Related Art

An anti-shake apparatus for a photographing apparatus is proposed. The anti-shake apparatus corrects for the hand-shake effect by moving a hand-shake correcting lens or an imaging device on a plane that is perpendicular to the optical axis, corresponding to the amount of hand-shake which occurs during imaging.

Japanese unexamined patent publication (KOKAI) No. 63-099680 discloses an anti-shake apparatus for a photographing apparatus. The anti-shake apparatus performs linear movement and rotating operations of a movable unit, which includes a hand-shake correcting lens, by using a magnet and a coil, and performs a position-detecting operation of the movable unit, by using a hall element and a magnet. The linear movement operation is for correcting the linear movement component of the hand-shake of the photographing apparatus. The rotating operation is for correcting the rotational movement component of the hand-shake of the photographing apparatus.

However, the moving apparatus for the linear movement and the moving apparatus for the rotating are separated, so that the anti-shake apparatus is enlarged

SUMMARY OF THE INVENTION

Therefore, an object of the present invention is to provide an apparatus in which the moving apparatus for performing the rotational component of the anti-shake operation, for the photographing apparatus, and the moving apparatus for performing the linear movement component of the anti-shake operation, for the photographing apparatus, is one body.

According to the present invention, an anti-shake apparatus of a photographing apparatus comprises a movable unit and a fixed unit.

The movable unit has one of an imaging device and a hand-shake correcting lens and can be moved and rotated on a plane which is perpendicular to an optical axis of a camera lens of the photographing apparatus.

The fixed unit supports the movable unit in a movable and rotatable situation on the plane.

The movable unit and the fixed unit have a position-detecting apparatus that detects first position-information of the movable unit in a first direction being perpendicular to the optical axis, and detects second position-information of the movable unit in a second direction being perpendicular to the optical axis and the first direction.

One of the movable unit and the fixed unit has an optical sensor unit that has one or more position-detecting elements which are used for detecting the first position-information, and that has two or more position-detecting elements which are used for detecting the second position-information, as the position-detecting apparatus.

Another of the movable unit and the fixed unit has a slit light-source unit that has one or more slit light-sources which are used for detecting the first position-information, and that has two or more slit light-sources which are used for detecting the second position-information, as the position-detecting apparatus.

The number of the position-detecting elements which are used for detecting the first position-information is the same as the number of the slit light-sources which are used for detecting the first position-information.

The number of the position-detecting elements which are used for detecting the second position-information is the same as the number of the slit light-sources which are used for detecting the second position-information.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
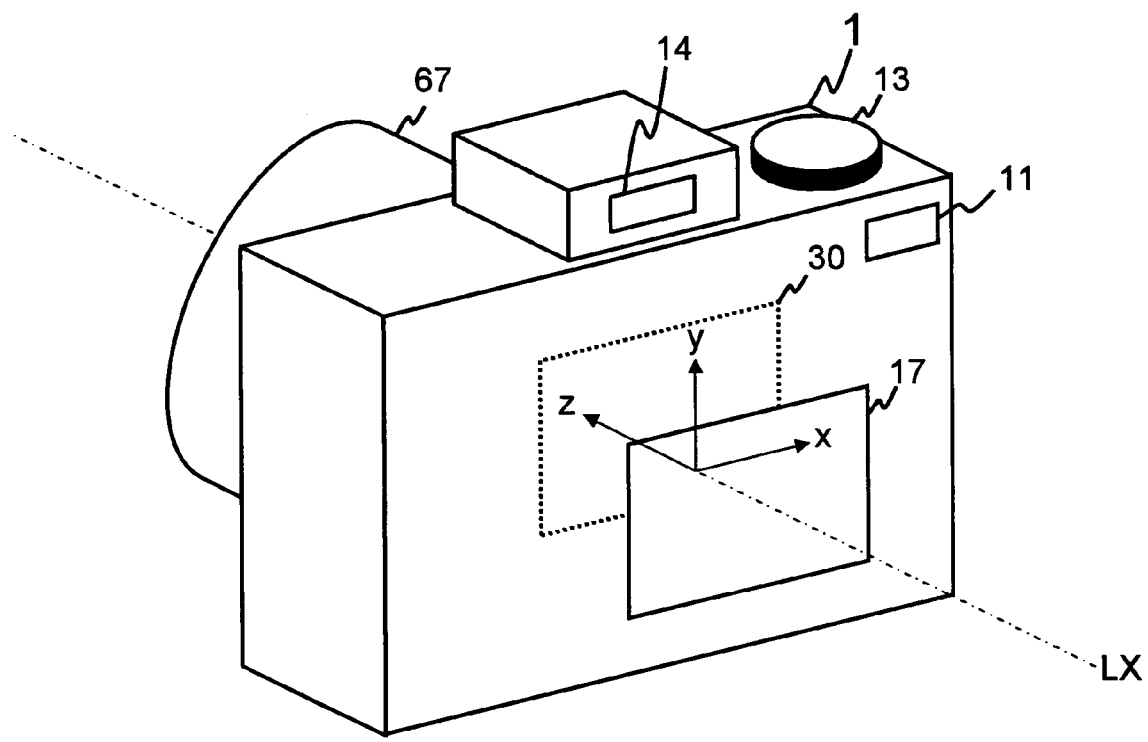
FIG. 1 is a perspective view of a photographing apparatus of the embodiments viewed from the back side of the photographing apparatus.

The present invention is described below with reference to the embodiments shown in the drawings. In these embodiments, the photographing apparatus 1 is a digital camera. The photographing apparatus 1 has an optical axis LX.

In order to explain the direction in this embodiment, a first direction x, a second direction y, and a third direction z are defined (see FIG. 1). The first direction x is a horizontal direction which is perpendicular to the optical axis LX. The second direction y is a vertical direction which is perpendicular to the optical axis LX and the first direction x. The third direction z is a horizontal direction which is parallel to the optical axis LX and perpendicular to both the first direction x and the second direction y.

A first embodiment is explained by using FIGS. 1 to 6.

Figure 4:
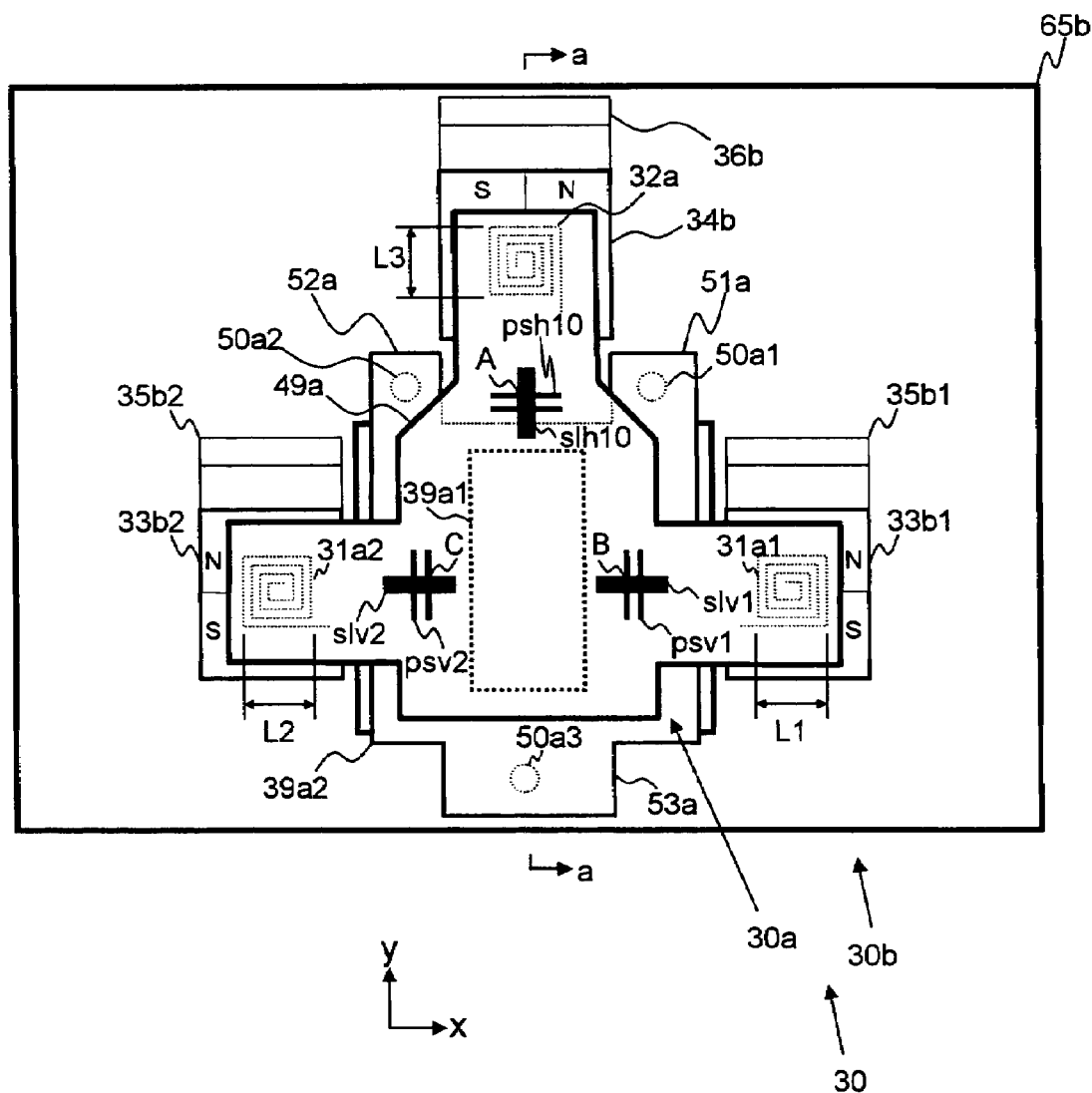
FIG. 4 is a figure showing the construction of the anti-shake unit, in the first embodiment.
Figure 5:
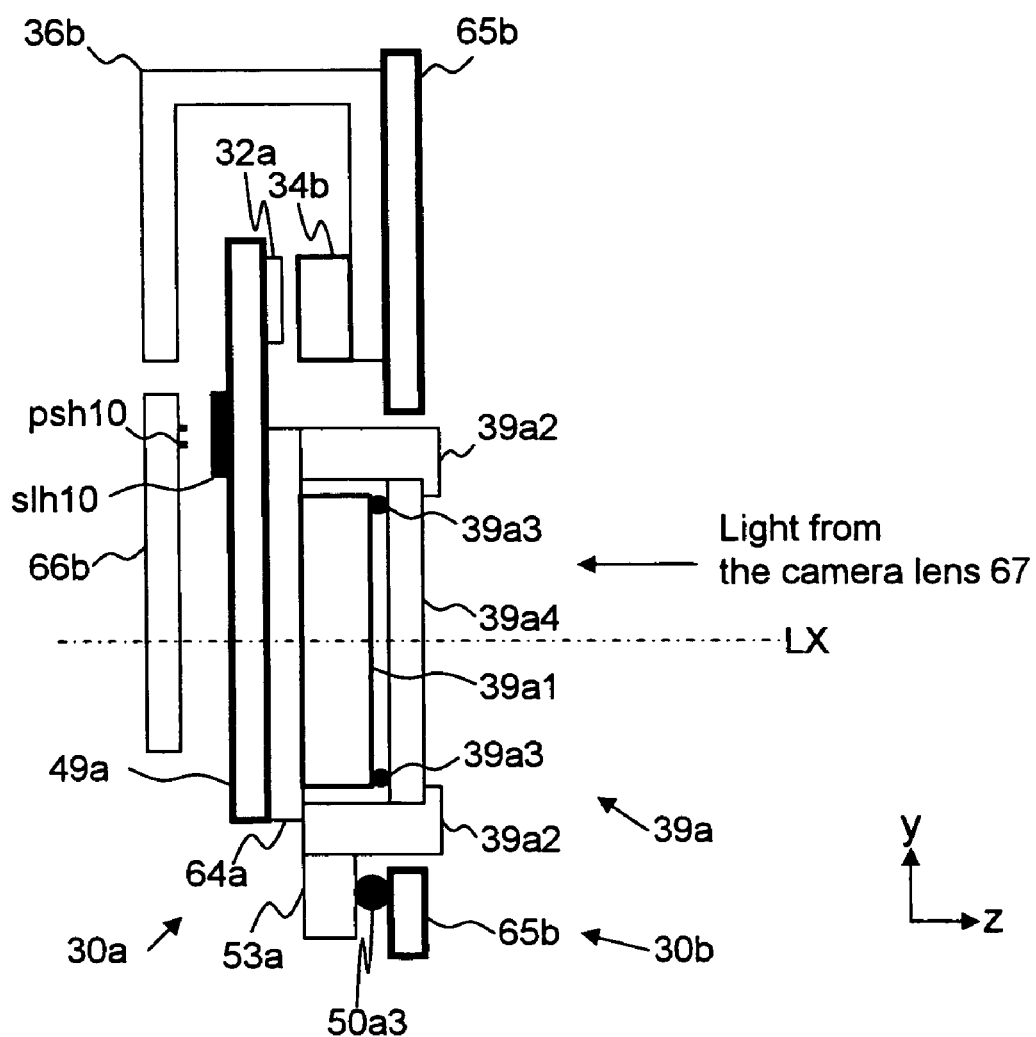
FIG. 5 is a view along line a-a of FIG. 4.

In FIG. 4, the first sensor circuit board 66b is omitted. FIG. 5 shows a construction diagram of the section along line a-a of FIG. 4.

Figure 2:
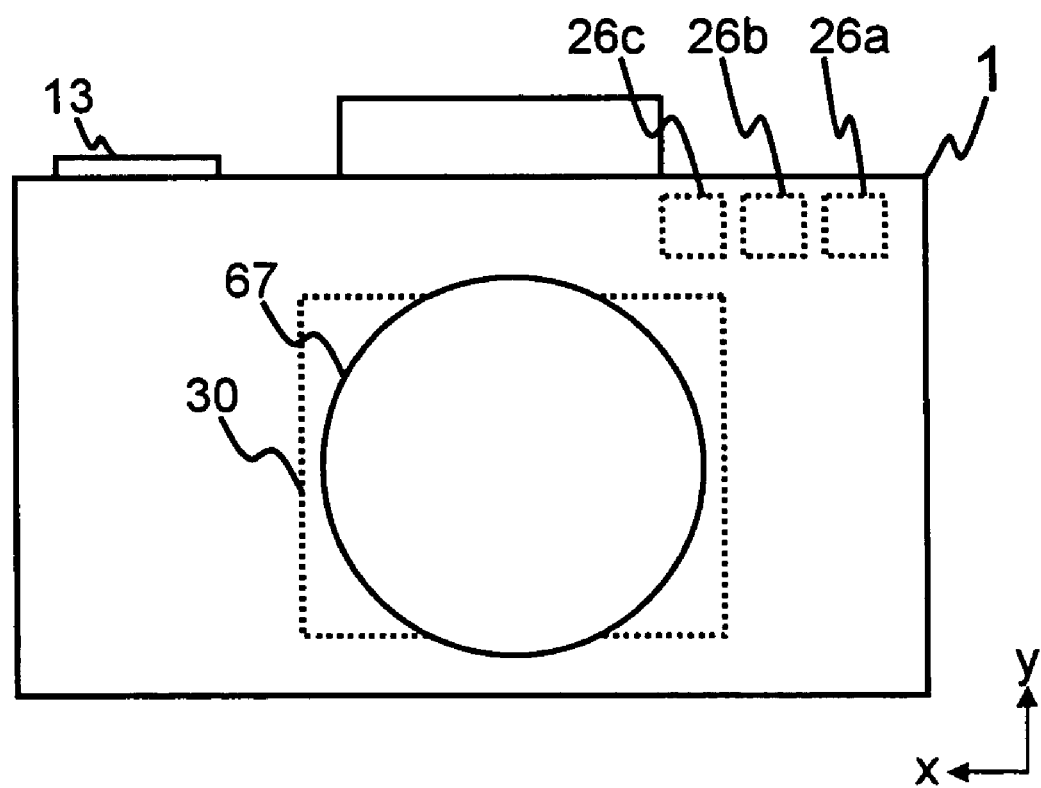
FIG. 2 is a front view of the photographing apparatus.
Figure 3:
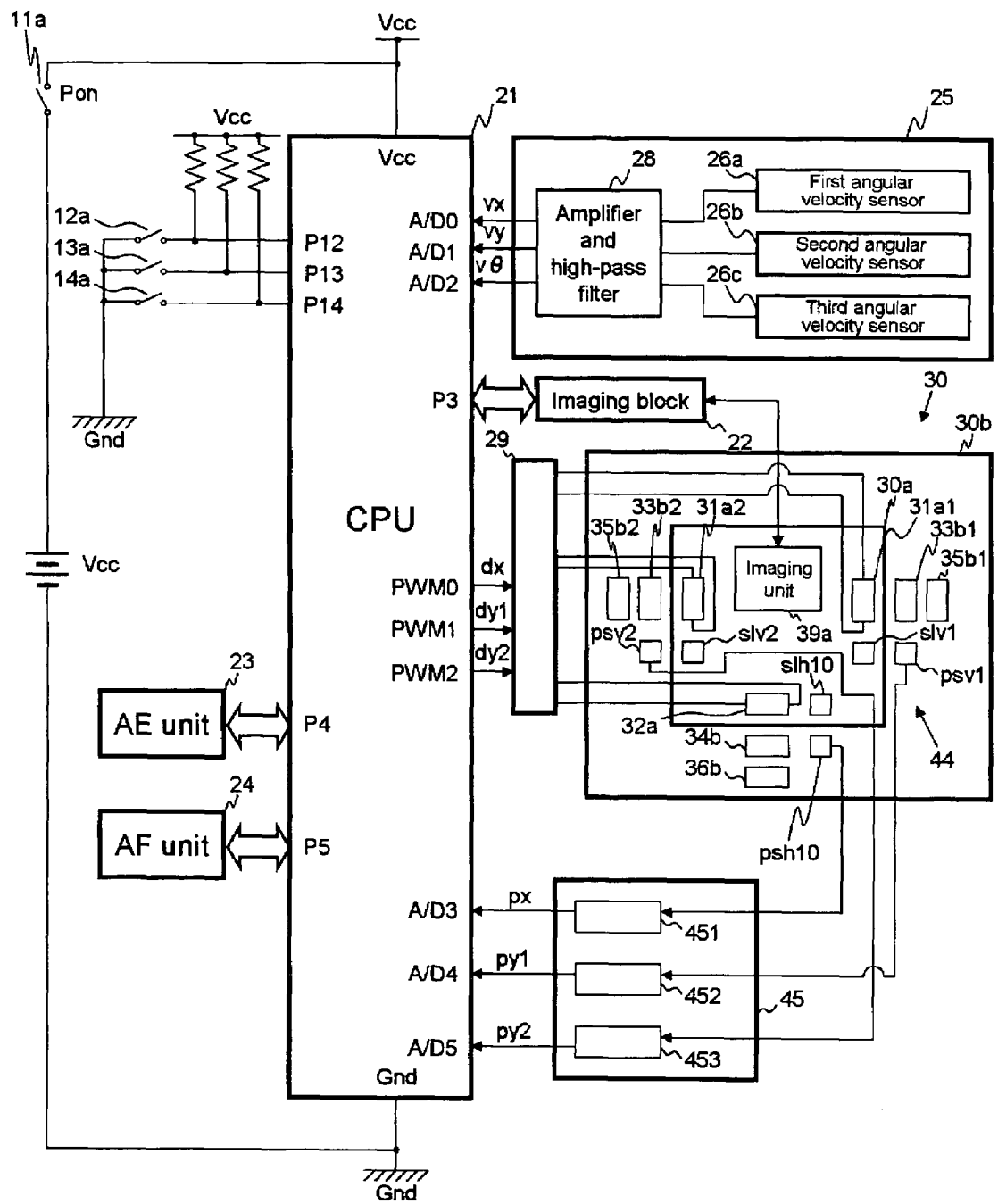
FIG. 3 is a circuit construction diagram of the photographing apparatus, in the first embodiment.

The imaging part of the photographing apparatus 1 comprises a Pon button 11, a Pon switch 11a, a photometric switch 12a, a release button 13, a release switch 13a, an indicating unit 17 such as an LCD monitor etc., a first CPU 21, an imaging block 22, an AE (automatic exposure) unit 23, an AF (automatic focusing) unit 24, an imaging unit 39a in the first anti-shake apparatus 30, and a camera lens 67 (see FIGS. 1, 2, and 3).

Whether the Pon switch 11a is in the on state or the off state, is determined by a state of the Pon button 11, so that the on/off states of the photographing apparatus 1 are changed corresponding to the of/off states of the Pon switch 11a.

The photographic subject image is taken as an optical image through the camera lens 67 by the imaging block 22, which drives the imaging unit 39*a*, so that the image, which is taken, is indicated on the indicating unit 17. The photographic subject image can be optically observed by the optical finder (not depicted).

When the release button 13 is half pushed by the operator, the photometric switch 12*a* changes to the on state, so that the photometric operation, the AF sensing operation, and the focusing operation are performed.

When the release button 13 is fully pushed by the operator, the release switch 13*a* changes to the on state, so that the imaging operation is performed, and the image, which is taken, is stored.

The first CPU 21 is a control apparatus, which controls each part of the photographing apparatus 1 regarding the imaging operation, and controls each part of the photographing apparatus 1 regarding the anti-shake operation. The anti-shake operation controls the movement of the first movable unit 30*a* and controls detecting the position of the first movable unit 30*a*.

The imaging block 22 drives the imaging unit 39*a*. The AE unit 23 performs the photometric operation for the photographic subject, calculates the photometric values, and calculates the aperture value and the time length of the exposure time, which is needed for imaging, corresponding to the photometric values. The AF unit 24 performs the AF sensing operation, and performs the focusing operation, which is needed for the imaging, corresponding to the result of the AF sensing operation. In the focusing operation, the position of the camera lens 67 is moved in the optical axis LX direction.

The anti-shaking part of the photographing apparatus 1 comprises an anti-shake button 14, an anti-shake switch 14*a*, a first CPU 21, an angular velocity detecting unit 25, a first driver circuit 29, a first anti-shake apparatus 30, a first optical-sensor signal-processing unit 45, and the camera lens 67.

When the anti-shake button 14 is fully pushed by the operator, the anti-shake switch 14*a* changes to the on state, so that the anti-shake operation is performed where the angular velocity detecting unit 25 and the first anti-shake apparatus 30 are driven, at every predetermined time interval, independently of the other operations which include the photometric operation etc.

The various output commands corresponding to the input signals of these switches are controlled by the first CPU 21.

The information regarding whether the photometric switch 12*a* is in the on state or in the off state, is input to port P12 of the first CPU 21 as a 1-bit digital signal. The information regarding whether the release switch 13*a* is in the on state or in the off state, is input to port P13 of the first CPU 21 as a 1-bit digital signal. The information regarding whether the anti-shake switch 14*a* is in the on state or in the off state, is input to port P14 of the first CPU 21 as a 1-bit digital signal.

The imaging block 22 is connected to port P3 of the first CPU 21 for inputting and outputting signals. The AE unit 23 is connected to port P4 of the first CPU 21 for inputting and outputting signals. The AF unit 24 is connected to port P5 of the first CPU 21 for inputting and outputting signals.

Next, the details of the input and output relationship with the first CPU 21 for the angular velocity unit 25, the first driver circuit 29, the first anti-shake apparatus 30, and the first optical-sensor signal-processing unit 45, are explained.

The angular velocity unit 25 has a first angular velocity sensor 26*a*, a second angular velocity sensor 26*b*, and a combined amplifier and high-pass filter circuit 28. The first angular velocity sensor 26*a* detects the velocity-component in the first direction x of the angular velocity of the photographing apparatus 1, at every predetermined time interval (1 ms). The second angular velocity sensor 26*b* detects the velocity-component in the second direction y of the angular velocity of the photographing apparatus 1, at every predetermined time interval (1 ms).

The combined amplifier and high-pass filter circuit 28 amplifies the signal regarding the first direction x of the angular velocity (the velocity-component in the first direction x of the angular velocity), reduces a null voltage and a panning of the first angular velocity sensor 26*a*, and outputs the analogue signal to the A/D converter A/D 0 of the first CPU 21 as a first angular velocity vx.

The combined amplifier and high-pass filter circuit 28 amplifies the signal regarding the second direction y of the angular velocity (the velocity-component in the second direction y of the angular velocity), reduces a null voltage and a panning of the second angular velocity sensor 26*b*, and outputs the analogue signal to the A/D converter A/D 1 of the first CPU 21 as a second angular velocity vy.

The angular velocity unit 25 also has a third angular velocity sensor 26*c*. The third angular velocity sensor 26*c* detects the rotation-velocity-component of the angular velocity on an xy plane of the photographing apparatus 1, at every predetermined time interval (1 ms). The xy plane is a plane which is perpendicular to the third direction z.

The combined amplifier and high-pass filter circuit 28 amplifies the signal regarding the rotation-speed of the angular velocity (the rotation-velocity-component on the xy plane of the angular velocity), reduces a null voltage and a panning of the third angular velocity sensor 26*c*, and outputs the analogue signal to the A/D converter A/D 2 of the first CPU 21 as a third angular velocity vθ.

The first CPU 21 converts the first angular velocity vx which is input to the A/D converter A/D 0, and the second angular velocity vy which is input to the A/D converter A/D 1, and the third angular velocity vθ which is input to the A/D converter A/D 2, to digital signals (A/D converting operation), and calculates the hand-shake quantity, which occurs in the predetermined time (1 ms), on the basis of the converted digital signals and the converting coefficient, where focal distance is considered. This hand-shake quantity includes a component in the first direction x, a component in the second direction y, and a rotation-component on the xy plane. Accordingly, the first CPU 21 and the angular velocity detecting unit 25 have a function which calculates the hand-shake quantity.

The first CPU 21 calculates the position S of the imaging unit 39*a* (the first movable unit 30*a*), which should be moved to and rotated to, corresponding to the hand-shake quantity which is calculated, for the first direction x, the second direction y, and the rotation angle.

The location in the first direction x of the position S is defined as sx, and the location in the second direction y of the position S is defined as sy, and the rotation angle on the xy plane of the position S is defined as sθ. The movement of the first movable unit 30*a*, which includes the imaging unit 39*a*, is performed by using electro-magnetic force and is described later. The driving force D, which drives the first driver circuit 29 in order to move and rotate the first movable unit 30*a* to the position S, has a horizontal PWM duty dx as the driving-force component in the first direction x, and a first vertical PWM duty dy1 as one of the driving-force components in the second direction y, and a second vertical PWM duty dy2 as another of the driving-force components in the second direction y.

The first anti-shake apparatus 30 is an apparatus which corrects the hand-shake effect, by moving and rotating the imaging unit 39*a* to the position S, by canceling lag of the photographic subject image on the imaging surface of the imaging device 39*a*1, and by stabilizing the photographing subject image that reaches the imaging surface of the imaging device 39a1. This lag includes a rotation-component.

The first anti-shake apparatus 30 has a first movable unit 30a, which includes the imaging unit 39a, and a first fixed unit 30b. Or, the first anti-shake apparatus 30 is composed of a driving part which moves the first movable unit 30a by electro-magnetic force to the position S, and a position-detecting part which detects the position of the first movable unit 30a (a detected-position P).

The size and the direction of the electro-magnetic force are determined by the size and the direction of the current which flows in the coil, and the size and the direction of the magnetic-field of the magnet.

The driving of the first movable unit 30a of the first anti-shake apparatus 30, is performed by the first driver circuit 29 which has the horizontal PWM duty dx input from the PWM 0 of the first CPU 21 and has the first vertical PWM duty dy1 input from the PWM 1 of the first CPU 21 and has the second vertical PWM duty dy2 input from the PWM 2 of the first CPU 21.

The detected-position P of the first movable unit 30a, either before moving and rotating or after moving and rotating, which is moved and rotated by driving the first driver circuit 29, is detected by the first position-detecting unit 44 and the first optical-sensor signal-processing unit 45.

Information in the first direction x for the detected-position P, in other words a horizontal detected-position signal px is input to the A/D converter A/D 3 of the first CPU 21. The horizontal detected-position signal px is an analogue signal, and is converted to a digital signal through the A/D converter A/D 3 (A/D converting operation).

Information in the second direction y for the detected-position P, in other words the first and second vertical detected-position signals py1 and py2, is input to the A/D converters A/D 4 and A/D 5 of the first CPU 21. The first vertical detected-position signal py1 is an analogue signal, and is converted to a digital signal through the A/D converter A/D 4 (A/D converting operation). The second vertical detected-position signal py2 is an analogue signal, and is converted to a digital signal through the A/D converter A/D 5 (A/D converting operation).

A data in the first direction x for the detected-position P, after the A/D converting operation, is defined as pdx, corresponding to the horizontal detected-position signal px.

A first data in the second direction y for the detected-position P, after the A/D converting operation, is defined as pdy1, corresponding to the first vertical detected-position signal py1.

A second data in the second direction y for the detected-position P, after the A/D converting operation, is defined as pdy2, corresponding to the second vertical detected-position signal py2.

A first location in the first direction x for the detected-position P, after the calculating operation for the data pdx, pdy1, and pdy2, is defined as pxx.

A second location in the second direction y for the detected-position P, after the calculating operation for the data pdx, pdy1, and pdy2, is defined as pyy.

A rotation angle on the xy plane for the detected-position P, after the calculating operation for the data pdx, pdy1, and pdy2, is defined as pθ.

The PID (Proportional Integral Differential) control is performed on the basis of the data for the detected-position P (pxx, pyy, pθ) and the data for the position S (sx, sy, sθ) which should be moved to and rotated to.

The first movable unit 30a has a first vertical driving coil 31a1, a second vertical driving coil 31a2, a horizontal driving coil 32a, an imaging unit 39a, a first slit light-source unit of a first position-detecting unit 44, a first movable circuit board 49a, a first ball for movement 50a1, a second ball for movement 50a2, a third ball for movement 50a3, a first ball-bearing for movement 51a, a second ball-bearing for movement 52a, a third ball-bearing for movement 53a, and a plate 64a (see FIGS. 4 and 5).

The first fixed unit 30b has a first vertical driving magnet 33b1, a second vertical driving magnet 33b2, a horizontal driving magnet 34b, a first vertical driving yoke 35b1, a second vertical driving yoke 35b2, a horizontal driving yoke 36b, a first optical sensor unit of the first position-detecting unit 44, a first base board 65b, and a first sensor circuit board 66b.

The first movable unit 30a contacts the first fixed unit 30b, through the first, second, and third balls 50a1, 50a2, and 50a3. The first ball for movement 50a1 can roll between the first ball-bearing for movement 51a and the first base board 65b. The second ball for movement 50a2 can roll between the second ball-bearing for movement 52a and the first base board 65b. The third ball for movement 50a3 can roll between the third ball-bearing for movement 53a and the first base board 65b.

The contacted situation of the first movable unit 30a and the first fixed unit 30b is kept through the first, second, and third balls 50a1, 50a2, and 50a3.

The first movable unit 30a is urged in the third direction z, by an urging member such as a spring etc., which is fixed in the photographing apparatus 1. Therefore, the movable and rotatable situation of the first movable unit 30a on the xy plane is maintained. Or, the first fixed unit 30b supports the first movable unit 30a in the movable and rotatable situation.

When the center area of the imaging device 39a1 is located on the optical axis LX of the camera lens 67, the location relation between the first movable unit 30a and the first fixed unit 30b is set up so that the first movable unit 30a is located at the center of its movement range in both the first direction x and the second direction y, in order to utilize the full size of the imaging range of the imaging device 39a1.

A rectangle shape, which forms the imaging surface (the valid pixel area) of the imaging device 39a1, has two diagonal lines. In the first embodiment, the center of the imaging device 39a1 is the crossing point of these two diagonal lines.

Four segments of the rectangular shape are parallel to the first direction x or the second direction y, before the first movable unit 30a is rotated.

In the first embodiment, the center of the imaging device 39a1 agrees with the center of gravity of the rectangle shape of the valid pixel area. Accordingly, when the first movable unit 30a is located at the center of its movement range, the center of gravity of the rectangle shape of the valid pixel area is located on the optical axis LX of the camera lens 67.

The imaging unit 39a, the plate 64a, and the first movable circuit board 49a are attached, in this order along the optical axis LX direction, viewed from the side of the camera lens 67. The imaging unit 39a has an imaging device 39a1 (such as a CCD or a COMS etc.), a stage 39a2, a holding unit 39a3, and an optical low-pass filter 39a4. The stage 39a2 and the plate 64a hold and urge the imaging device 39a1, the holding unit 39a3, and the optical low-pass filter 39a4 in the optical axis LX direction.

The first, second, and third ball-bearings 51a, 52a, and 53a are attached to the stage 39a2. The imaging device 39a1 is attached to the plate 64a, so that positioning of the imaging device 39a1 is performed where the imaging device 39a1 is perpendicular to the optical axis LX of the camera lens 67. In the case where the plate 64a is made of a metallic material, the plate 64a has the effect of radiating heat from the imaging device 39a1, by contacting the imaging device 39a1.

The first vertical driving coil 31a1, the second vertical driving coil 31a2, and the horizontal driving coil 32a, are attached to the first movable circuit board 49a.

The first vertical driving coil 31a1 forms a seat and a spiral shape coil pattern. The coil pattern of the first vertical driving coil 31a1 has a line segment which is parallel to the first direction x, before the first movable unit 30a is rotated. The first movable unit 30a which includes the first vertical driving coil 31a1, is moved in the second direction y, by the first electromagnetic force Pw1. The line segment which is parallel to the first direction x, is used for moving the first movable unit 30a in the second direction y. The line segment which is parallel to the first direction x, has a first effective length L1.

The first electromagnetic force Pw1 occurs on the basis of the current direction of the first vertical driving coil 31a1 and the magnetic-field direction of the first vertical driving magnet 33b1.

The second vertical driving coil 31a2 forms a seat and a spiral shape coil pattern. The coil pattern of the second vertical driving coil 31a2 has a line segment which is parallel to the first direction x, before the first movable unit 30a is rotated. The first movable unit 30a which includes the second vertical driving coil 31a2, is moved in the second direction y, by the second electromagnetic force Pw2. The line segment which is parallel to the first direction x, is used for moving the first movable unit 30a in the second direction y. The line segment which is parallel to the first direction x, has a second effective length L2.

The second electromagnetic force Pw2 occurs on the basis of the current direction of the second vertical driving coil 31a2 and the magnetic-field direction of the second vertical driving magnet 33b2.

In the first embodiment, the first vertical driving coil 31a1 is attached to the right edge area of the first movable circuit board 49a (one of the edge areas of the first movable circuit board 49a in the first direction x), viewed from the third direction z and from the opposite side of the camera lens 67.

Similarly, the second vertical driving coil 31a2 is attached to the left edge area of the first movable circuit board 49a (another of the edge areas of the first movable circuit board 49a in the first direction x), viewed from the third direction z and from the opposite side of the camera lens 67.

Similarly, the horizontal driving coil 32a is attached to the upper area of the first movable circuit board 49a (one of the edge areas of the first movable circuit board 49a in the second direction y), viewed from the third direction z and from the opposite side of the camera lens 67.

The imaging device 39a1 is attached to the middle area of the first movable circuit board 49a between the first and second vertical driving coils 31a1 and 31a2, in the first direction x.

The first and second vertical driving coils 31a1 and 31a2 and the horizontal driving coil 32a, and the imaging device 39a1 are attached on the same side of the first movable circuit board 49a.

The location relation between the first and second vertical driving coils 31a1 and 31a2 is set up so that the optical axis LX is located between the first and second vertical driving coils 31a1 and 31a2 in the first direction x, before the first movable unit 30a is rotated. In other words, the first and second vertical driving coils 31a1 and 31a2 are arranged in a symmetric position centering on the optical axis LX. Therefore, the first movable unit 30a can be rotated around an intersection area between the xy plane and the optical axis LX, in other words a center area of the imaging device 39a1, by the first and second electro-magnetic forces Pw1 and Pw2. Further, even if the direction of the first electro-magnetic force Pw1 is opposite to or the same as the direction of the second electro-magnetic force Pw2, when the quantity of the first electro-magnetic force Pw1 is different from the quantity of the second electro-magnetic force Pw2, the first movable unit 30a can be rotated.

The first and second vertical driving coils 31a1 and 31a2 are arranged on the first movable circuit board 49a, where a distance between the center of the imaging device 39a1 and the center area of the first vertical driving coil 31a1 is the same as a distance between the center of the imaging device 39a1 and the center area of the second vertical driving coil 31a2.

The horizontal driving coil 32a forms a seat and a spiral shape coil pattern. The coil pattern of the horizontal driving coil 32a has a line segment which is parallel to the second direction y, before the first movable unit 30a is rotated. The first movable unit 30a which includes the horizontal driving coil 32a, is moved in the first direction x, by the third electromagnetic force Pw3. The line segment which is parallel to the second direction y, is used for moving the first movable unit 30a in the first direction x. The line segment which is parallel to the second direction y, has a third effective length L3.

The third electro-magnetic force Pw3 occurs on the basis of the current direction of the horizontal driving coil 32a and the magnetic-field direction of the horizontal driving magnet 34b.

Because the two coils (31a1 and 31a2) are used for moving the first movable unit 30a in the second direction y and because the first movable unit 30a is movable and rotatable on the xy plane relative to the first fixed unit 30b by the first, second, and third balls 50a1, 50a2, and 50a3, the first movable unit 30a can be moved and rotated on the xy plane by the first and second vertical driving coils 31a1 and 31a2 and the horizontal driving coil 32a, relative to the first fixed unit 30b.

Further, because the horizontal driving coil 32a and the first and second vertical driving coils 31a1 and 31a2 are seat coils, the thickness of each coil in the third direction z can be small. Accordingly, even if the horizontal driving coil 32a and the first and second vertical driving coils 31a1 and 31a2 are composed of a plurality of seat coils which are layered in the third direction z, for increasing the electro-magnetic force, the thickness of each coil in the third direction z hardly increases. Therefore, the first anti-shake apparatus 30 can be downsized by restraining the distance between the first movable unit 30a and the first fixed unit 30b.

The first and second vertical driving coils 31a1 and 31a2 and the horizontal driving coil 32a are connected with the first driver circuit 29 which drives the first and second vertical driving coils 31a1 and 31a2 and the horizontal driving coil 32a through the flexible circuit board (not depicted). The horizontal PWM duty dx is input to the first driver circuit 29 from the PWM 0 of the first CPU 21, and the first vertical PWM duty dy1 is input to the first driver circuit 29 from the PWM 1 of the first CPU 21, and the second vertical PWM duty dy2 is input to the first driver circuit 29 from the PWM 2 of the first CPU 21. The first driver circuit 29 supplies power to the horizontal driving coil 32a corresponding to the value of the horizontal PWM duty dx, and to the first vertical driving coil 31a1 corresponding to the value of the first vertical PWM duty dy1, and to the second vertical driving coil 31a2 corresponding to the value of the second vertical PWM duty dy2, to drive (move and rotate) the first movable unit 30a.

When the first movable unit 30a is moved in the second direction y, the first CPU 21 controls the values of the first and second vertical PWM duties dy1 and dy2 where the direction of the first electro-magnetic force Pw1 is the same as the direction of the second electro-magnetic force Pw2 and where the quantity of the first electro-magnetic force Pw1 is the same as the quantity of the second electro-magnetic force Pw2.

When the first movable unit 30a is rotated on the xy plane, the first CPU 21 controls the values of the first and second vertical PWM duties dy1 and dy2 where the direction of the first electro-magnetic force Pw1 is opposite to the direction of the second electro-magnetic force Pw2 and where the quantity of the first electro-magnetic force Pw1 is the same as the quantity of the second electro-magnetic force Pw2.

When the first movable unit 30a is moved in the second direction y and rotated on the xy plane, the first CPU 21 controls the values of the first and second vertical PWM duties dy1 and dy2 where the direction of the first electro-magnetic force Pw1 is the same as the direction of the second electro-magnetic force Pw2 and where the quantity of the first electro-magnetic force Pw1 is different from the quantity of the second electro-magnetic force Pw2.

The first vertical driving magnet 33b1 is attached to the movable unit side of the first fixed unit 30b, where the first vertical driving magnet 33b1 faces the first vertical driving coil 31a1 in the third direction z.

The second vertical driving magnet 33b2 is attached to the movable unit side of the first fixed unit 30b, where the second vertical driving magnet 33b2 faces the second vertical driving coil 31a2 in the third direction z.

The horizontal driving magnet 34b is attached to the movable unit side of the first fixed unit 30b, where the horizontal driving magnet 34b faces the horizontal driving coil 32a in the third direction z.

The first vertical driving magnet 33b1 is attached to the first vertical driving yoke 35b1, under the condition where the N pole and S pole are arranged in the second direction y. The first vertical driving yoke 35b1 is attached to the first base board 65b of the first fixed unit 30b, on the side of the first movable unit 30a, in the third direction z.

The length of the first vertical driving magnet 33b1 in the first direction x, is longer in comparison with the first effective length L1 of the first vertical driving coil 31a1. The magnetic-field which influences the first vertical driving coil 31a1, is not changed during movement of the first movable unit 30a in the first direction x.

The second vertical driving magnet 33b2 is attached to the second vertical driving yoke 35b2, under the condition where the N pole and S pole are arranged in the second direction y. The second vertical driving yoke 35b2 is attached to the first base board 65b of the first fixed unit 30b, on the side of the first movable unit 30a, in the third direction z.

The length of the second vertical driving magnet 33b2 in the first direction x, is longer in comparison with the second effective length L2 of the second vertical driving coil 31a2. The magnetic-field which influences the second vertical driving coil 31a2, is not change during movement of the first movable unit 30a in the first direction x.

The horizontal driving magnet 34b is attached to the horizontal driving yoke 36b, under the condition where the N pole and S pole are arranged in the first direction x. The horizontal driving yoke 36b is attached to the first base board 65b of the first fixed unit 30b, on the side of the first movable unit 30a, in the third direction z.

The length of the horizontal driving magnet 34b in the second direction y, is longer in comparison with the third effective length L3 of the horizontal driving coil 32a. The magnetic-field which influences the horizontal driving coil 32a, is not changed during movement of the first movable unit 30a in the second direction y.

The first vertical driving yoke 35b1 is made of a soft magnetic material, and forms a square-u-shape channel when viewed from the first direction x. The first vertical driving magnet 33b1 and the first vertical driving coil 31a1 are inside the channel of the first vertical driving yoke 35b1.

The side of the first vertical driving yoke 35b1, which contacts the first vertical driving magnet 33b1, prevents the magnetic-field of the first vertical driving magnet 33b1 from leaking to the surroundings.

The other side of the first vertical driving yoke 35b1 (which faces the first vertical driving magnet 33b1, the first vertical driving coil 31a1, and the first movable circuit board 49a) raises the magnetic-flux density between the first vertical driving magnet 33b1 and the first vertical driving coil 31a1.

The second vertical driving yoke 35b2 is made of a soft magnetic material, and forms a square-u-shape channel when viewed from the first direction x. The second vertical driving magnet 33b2 and the second vertical driving coil 31a2 are inside the channel of the second vertical driving yoke 35b2.

The side of the second vertical driving yoke 35b2, which contacts the second vertical driving magnet 33b2, prevents the magnetic-field of the second vertical driving magnet 33b2 from leaking to the surroundings.

The other side of the second vertical driving yoke 35b2 (which faces the second vertical driving magnet 33b2, the second vertical driving coil 31a2, and the first movable circuit board 49a) raises the magnetic-flux density between the second vertical driving magnet 33b2 and the second vertical driving coil 31a2.

The horizontal driving yoke 36b is made of a soft magnetic material, and forms a square-u-shape channel when viewed from the first direction x. The horizontal driving magnet 34b and the horizontal driving coil 32a are inside the channel of the horizontal driving yoke 36b.

The side of the horizontal driving yoke 36b, which contacts the horizontal driving magnet 34b, prevents the magnetic-field of the horizontal driving magnet 34b from leaking to the surroundings.

The other side of the horizontal driving yoke 36b (which faces the horizontal driving magnet 34b, the horizontal driving coil 32a, and the first movable circuit board 49a) raises the magnetic-flux density between the horizontal driving magnet 34b and the horizontal driving coil 32a.

The first position-detecting unit 44 has a first slit light-source unit and a first optical sensor unit.

The first slit light-source unit is a light source, such as an LED, which radiates a linear-shaped light, and has a horizontal slit light-source slh10, a first vertical slit light-source slv1, and a second vertical slit light-source slv2. The first slit light-source unit is attached to the first movable circuit board 49a of the first movable unit 30a.

The first optical sensor unit is a semiconductor element which has a linear-shaped receiving surface, such as a position sensitive detector (PSD). The first optical sensor unit can detect the locations of points (A, B, and C) which receive light from the first slit light-source unit. The received light from the first slit light-source, being a light-pulse, flows through the terminals of the first optical sensor unit, so that information of the position is converted to a voltage (photoelectric conversion).

The first optical sensor unit has a horizontal position-detecting element psh10, a first vertical position-detecting element psv1, and a second vertical position-detecting element psv2. The first optical sensor unit is attached to the first sensor circuit board 66b of the first fixed unit 30b.

In FIG. 3, cables between each component of the first slit light-source unit and the power supply are omitted.

The horizontal position-detecting element psh10 has a linear-shaped receiving surface which is parallel to the first direction x. The first vertical position detecting element psv1 has a linear-shaped receiving surface which is parallel to the second direction y. The second vertical position-detecting element psv2 has a linear-shaped receiving surface which is parallel to the second direction y.

The horizontal slit light-source slh10 and the horizontal driving coil 32a are arranged in the second direction y.

The first vertical slit light-source slv1 and the first vertical driving coil 31a1 are arranged in the first direction x.

The second vertical slit light-source slv2 and the second vertical driving coil 31a2 are arranged in the first direction x.

The horizontal position-detecting element psh10 faces the horizontal slit light-source slh10 in the third direction z, and crosses the horizontal slit light-source slh10 at a point A when viewed from the third direction z.

The first vertical position-detecting element phv1 faces the first vertical slit light-source slv1 in the third direction z, and crosses the first vertical slit light-source slv1 at a point B when viewed from the third direction z.

The second vertical position-detecting element phv2 faces the second vertical slit light-source slv2 in the third direction z, and crosses the second vertical slit light-source slv2 at a point C when viewed from the third direction z.

In the first embodiment, the first vertical slit light-source slv1 is attached to the right edge area of the first movable circuit board 49a (one of the edge areas of the first movable circuit board 49a in the first direction x), viewed from the third direction z and from the opposite side of the camera lens 67.

Similarly, the second vertical slit light-source slv2 is attached to the left edge area of the first movable circuit board 49a (another of the edge areas of the first movable circuit board 49a in the first direction x), viewed from the third direction z and from the opposite side of the camera lens 67.

Similarly, the horizontal slit light-source slh10 is attached to the upper area of the first movable circuit board 49a (one of the edge areas of the first movable circuit board 49a in the second direction y), viewed from the third direction z and from the opposite side of the camera lens 67.

The first and second vertical slit light-sources slv1 and slv2 and the horizontal slit light-source slh10 are attached on the same side of the first movable circuit board 49a. The imaging device 39a1 and the first vertical slit light-source slv1 are attached on the opposite side of the first movable circuit board 49a.

The location relation between the first and second vertical slit light-sources slv1 and slv2 is set up so that the optical axis LX is located between the first and second vertical slit light-sources slv1 and slv2 in the first direction x, before the first movable unit 30a is rotated. In other words, the first and second vertical slit light-sources slv1 and slv2 are arranged in a symmetric position centering on the optical axis LX (or a center area of the imaging device 39a1).

It is desirable that the first and second vertical slit light-sources slv1 and slv2 are arranged on the first movable circuit board 49a, where a distance between the center of the imaging device 39a1 and the center area of the first vertical slit light-source slv1 is the same as a distance between the center of the imaging device 39a1 and the center area of the second vertical slit light-source slv2, in order to simplify the calculation of the position-detecting operation.

The above described location relation between the first slit light-source unit and the first optical sensor unit is kept, when the first movable unit 30a is in any position in its movement range.

The horizontal slit light-source slh10 is arranged on the first movable circuit board 49a so that the horizontal slit light-source slh10 radiates linear-shaped light in the second direction y before the first movable unit 30a is rotated.

The first and second vertical slit light-sources slv1 and slv2 are arranged on the first movable circuit board 49a so that the first and second vertical slit light-sources slv1 and slv2 radiate linear-shaped light in the first direction x before the first movable unit 30a is rotated.

The horizontal position-detecting element psh10 is arranged on the first sensor circuit board 66b so that the horizontal position-detecting element psh10 is parallel to the first direction x before the first movable unit 30a is rotated, and faces the horizontal slit light-source slh10 in the third direction z.

The first vertical position-detecting element psv1 is arranged on the first sensor circuit board 66b so that the first vertical position-detecting element psv1 is parallel to the second direction y before the first movable unit 30a is rotated, and faces the first vertical slit light-source slv1 in the third direction z.

The second vertical position-detecting element psv2 is arranged on the first sensor circuit board 66b so that the second vertical position-detecting element psv2 is parallel to the second direction y before the first movable unit 30a is rotated, and faces the second vertical slit light-source slv2 in the third direction z.

It is desirable that the point A is in an intermediate area of the horizontal position-detecting element psh10 in the first direction x, and in an intermediate area of the horizontal slit light-source slh10 in the second direction y, before the first movable unit 30a is moved and rotated (in an initial state), in other words the horizontal slit light-source slh10 crosses the horizontal position-detecting element psh10 at the intermediate area of the horizontal position-detecting element psh10 in the first direction x, and at the intermediate area of the horizontal slit light-source slh10 in the second direction y, in the initial state. That is, the horizontal position-detecting element psh10 detects the position at the intermediate area of the horizontal position-detecting element psh10 in the first direction x in the initial state.

Similarly, it is desirable that the point B is in an intermediate area of the first vertical position-detecting element psv1 in the second direction y, and in an intermediate area of the first vertical slit light-source slv1 in the first direction x, in the initial state, in other words the first vertical slit light-source slv1 crosses the first vertical position-detecting element psv1 at the intermediate area of the first vertical position-detecting element psv1 in the second direction y, and at the intermediate area of the first vertical slit light-source slv1 in the first direction x, in the initial state. That is, the first vertical position-detecting element psv1 detects the position at the intermediate area of the first vertical position-detecting element psv1 in the second direction y in the initial state.

Similarly, is it desirable that the point C is in an intermediate area of the second vertical position-detecting element psv2 in the second direction y, and in an intermediate area of the second vertical slit light-source slv2 in the first direction x, in the initial state, in other words the second vertical slit light-source slv2 crosses the second vertical position-detecting element psv2 at the intermediate area of the second vertical position-detecting element psv2 in the second direction y, and at the intermediate area of the second vertical slit light-source slv2 in the first direction x, in the initial state. That is, the second vertical position-detecting element psv2 detects the position at the intermediate area of the second vertical position-detecting element psv2 in the second direction y in the initial state.

Both the first base board 65b and the first sensor circuit board 66b are plate state members which become the base for attaching the horizontal driving yoke 36b etc., and are arranged being parallel to the imaging surface of the imaging device 39a1. The first sensor circuit board 66b is positioned such that the first optical sensor unit and the first slit light-source unit are between the first sensor circuit board 66b and the imaging device 39a1 in the third direction z (see FIG. 5).

In the first embodiment, the first base board 65b is arranged at the side nearer to the camera lens 67 in comparison with the first movable circuit board 49a, in the third direction z. However, the first movable circuit board 49a may be arranged at the side nearer to the camera lens 67 in comparison with the first base board 65b.

The first optical-sensor signal-processing unit 45 has a first optical-sensor signal-processing circuit 451 and a second optical-sensor signal-processing circuit 452 and a third optical-sensor signal-processing circuit 453.

The first optical-sensor signal-processing circuit 451 detects a horizontal potential-difference (as first position-information) between the output terminals of the horizontal position-detecting element psh10, based on an output signal of the horizontal position-detecting element psh10.

The first optical-sensor signal-processing circuit 451 outputs the horizontal detected-position signal px to the A/D converter A/D 3 of the first CPU 21, on the basis of the horizontal potential-difference. The horizontal detected-position signal px specifies a location of the part of the first movable unit 30a which has the horizontal slit light-source slh10, and of the point A where the horizontal slit light-source slh10 crosses the horizontal position-detecting element psh10 in the first direction x, when viewed from the third direction z.

The first optical-sensor signal-processing circuit 451 is connected with the horizontal position-detecting element psh10.

The second optical-sensor signal-processing circuit 452 detects a first vertical potential-difference (as one part of the second position-information) between the output terminals of the first vertical position-detecting element psv1, based on an output signal of the first vertical position-detecting element psv1.

The second optical-sensor signal-processing circuit 452 outputs the first vertical detected-position signal py1 to the A/D converter A/D 4 of the first CPU 21, on the basis of the first vertical potential-difference. The first vertical detected-position signal py1 specifies a location of the part of the first movable unit 30a which has the first vertical slit light-source slv1, and of the point B where the first vertical slit light-source slv1 crosses the first vertical position-detecting element psv1 in the second direction y, when viewed from the third direction z.

The second optical-sensor signal-processing circuit 452 is connected with the first vertical position-detecting element psv1.

The third optical-sensor signal-processing circuit 453 detects a second vertical potential-difference (as one part of the second position-information) between the output terminals of the second vertical position-detecting element psv2, based on an output signal of the second vertical position-detecting element psv2.

The third optical-sensor signal-processing circuit 453 outputs the second vertical detected-position signal py2 to the A/D converter A/D 5 of the first CPU 21, on the basis of the second vertical potential-difference. The second vertical detected-position signal py2 specifies a location of the part of the first movable unit 30a which has the second vertical slit light-source slh2, and of the point C where the second vertical slit light-source slv2 crosses the second vertical position-detecting element psv2 in the second direction y, when viewed from the third direction z.

The third optical-sensor signal-processing circuit 453 is connected with the second vertical position-detecting element psv2.

In the first embodiment, the three position-detecting elements (psh10, psv1 and psv2) are used for specifying the location of the first movable unit 30a which includes the rotation angle.

By using two of the three position-detecting elements (psv1 and psv2), the locations in the second direction y of the two points (the points B and C) on the first movable unit 30a are specified. By using another of the three position-detecting elements (psh10), the location in the first direction x of the one point (the point A) on the first movable unit 30a is specified. The location of the first movable unit 30a which includes the rotation angle on the xy plane, can be specified on the basis of the information regarding the locations in the first direction x of the one point (A) and the location in the second direction y of the two points (B and C).

Figure 6:
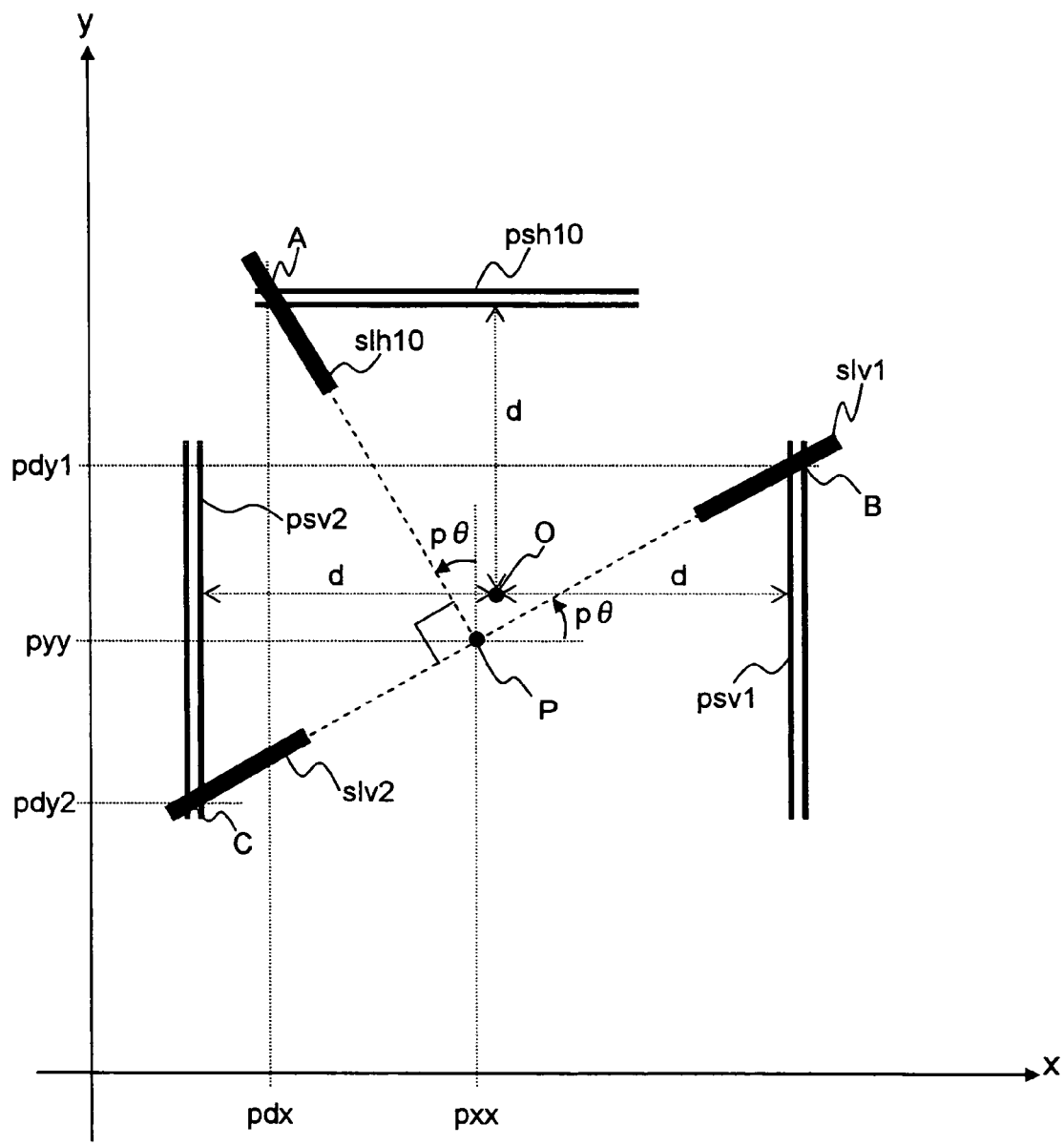
FIG. 6 is an example where the location of the point P is calculated on the basis of location-information of a point A, a point B, and a point C on the movable unit, in the first embodiment.

An example is explained using FIG. 6. The location of the point P (pxx, pyy, pθ) is calculated on the basis of the location-information of a point A, a point B, and a point C on the first movable unit 30a.

The point A is a point where the horizontal slit light-source slh10 crosses the horizontal position-detecting element psh10 when viewed from the third direction z. The point B is a point where the first vertical slit light-source slv1 crosses the first vertical position-detecting element psv1 when viewed from the third direction z. The point C is a point where the second vertical slit light-source slv2 crosses the second vertical position-detecting element psv2 when viewed from the third direction z.

The length of the segment BC is changed corresponding to the value of the rotation angle pθ.

The point P is defined as an intersection point between a segment BC and a line which passes through the point A and which is perpendicular to the segment BC.

The horizontal slit light-source slh10, the first and second vertical slit light-sources slv1 and slv2, and the imaging device 39a1 are arranged on the first movable circuit board 49a where the point P agrees with a center of the imaging device 39a1 in the third direction z, in the initial state. In the example of the first embodiment, the location relation in the initial state between the first movable unit 30a and the first fixed unit 30b is set so that a length between the center point O of the imaging device 39a1 and the first vertical position-detecting element psv1, a length between the center point O and the second vertical position-detecting element psv2, and a length between the center point O and the horizontal position-detecting element psh10 have the same value d, in order to simplify the calculation.

The location in the first direction x of the point A is detected by the horizontal position-detecting element psh10, as the horizontal detected-position signal px. The location in the second direction y of the point B is detected by the first vertical position-detecting element psv1, as the first vertical detected-position signal py1. The location in the second direction y of the point C is detected by the second vertical position-detecting element psv2, as the second vertical detected-position signal py2.

The data for the position P (pxx, pyy, pθ) are calculated on the basis of the data pdx which is converted from the horizontal detected-position signal px in the A/D converting operation, the data pdy1 which is converted from the first vertical detected-position signal py1 in the A/D converting operation, and the data pdy2 which is converted from the second vertical detected-position signal py2 in the A/D converting operation, and the length d, where $pxx=[pdx+\{d-\tan(p\theta) \times (pdy1+pdy2)/2\}]/\{1+\tan^2(p\theta)\}$, $pyy=\{((pdy1+pdy2)/2+pdx \times \tan(p\theta)+d \times \tan^2(p\theta)\}/\{1+\tan^2(p\theta)\}$, and $p\theta=\mathrm{Tan}^{-1}\{(pdy1-pdy2)/2d\}$. The rotation angle pθ is an angle between the first vertical slit light-source slv1 and the first direction x or between the horizontal slit light-source slh10 and the second direction y.

In the first embodiment, the first optical sensor unit has two position-detecting elements for detecting the location in the second direction y, and one position-detecting element for detecting the location in the first direction x. However, the first optical sensor unit may have one position-detecting element for detecting the location in the second direction y, and two position-detecting elements for detecting the location in the first direction x. In this case, the first slit light-source unit has one slit light-source facing the one position-detecting element for detecting the location in the second direction y, and two slit light-sources facing the two position-detecting elements for detecting the location in the first direction x.

Next, the second embodiment is explained. In the second embodiment, constructions of the driving coil, the driving magnet, the driving yoke, the position-detecting unit, and the optical-sensor signal-processing unit are different from those of the first embodiment (see FIGS. 7 to 10).

Figure 8:
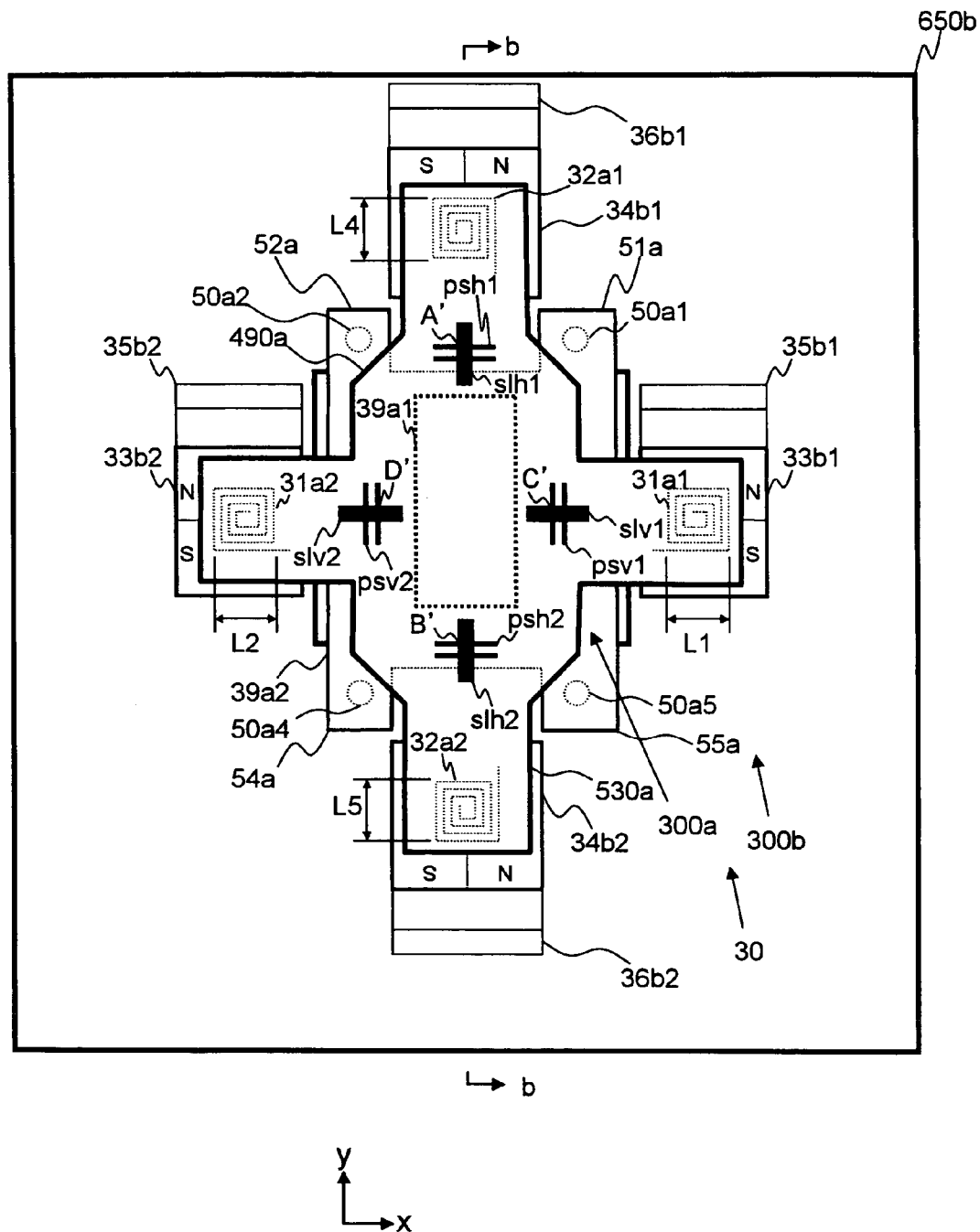
FIG. 8 is a figure showing the construction of the anti-shake unit, in the second embodiment.
Figure 9:
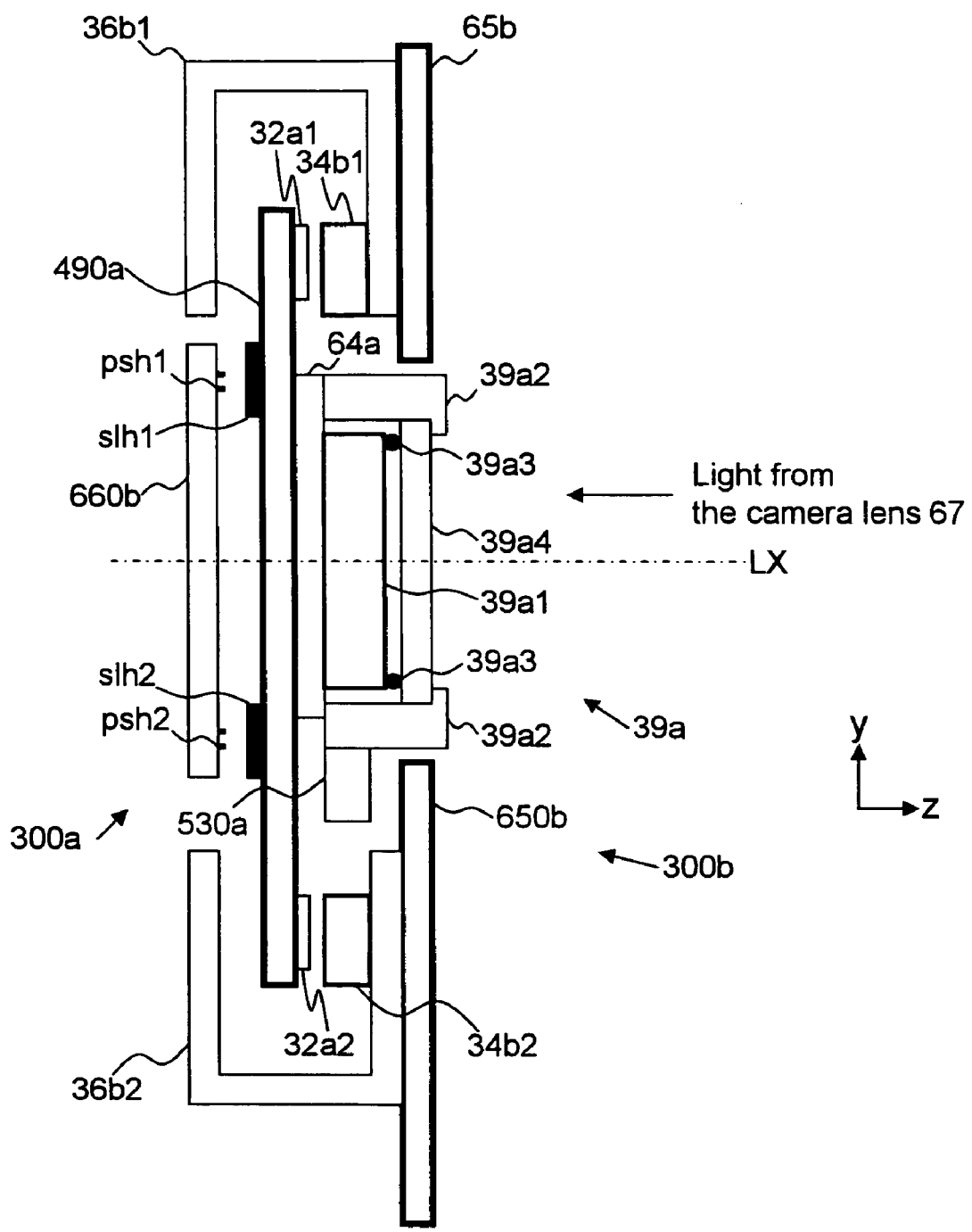
FIG. 9 is a view along line b-b of FIG. 8.

Therefore, the second embodiment is explained centering on the constructions of the photographing apparatus 1 in the second embodiment which are different from the constructions of the photographing apparatus 1 in the first embodiment. In FIG. 8, the second sensor circuit board 660b is omitted. FIG. 9 shows a construction diagram of the section along line b-b of FIG. 8. In the second embodiment, the parts that are the same as those of the first embodiment have the same sign.

Figure 7:
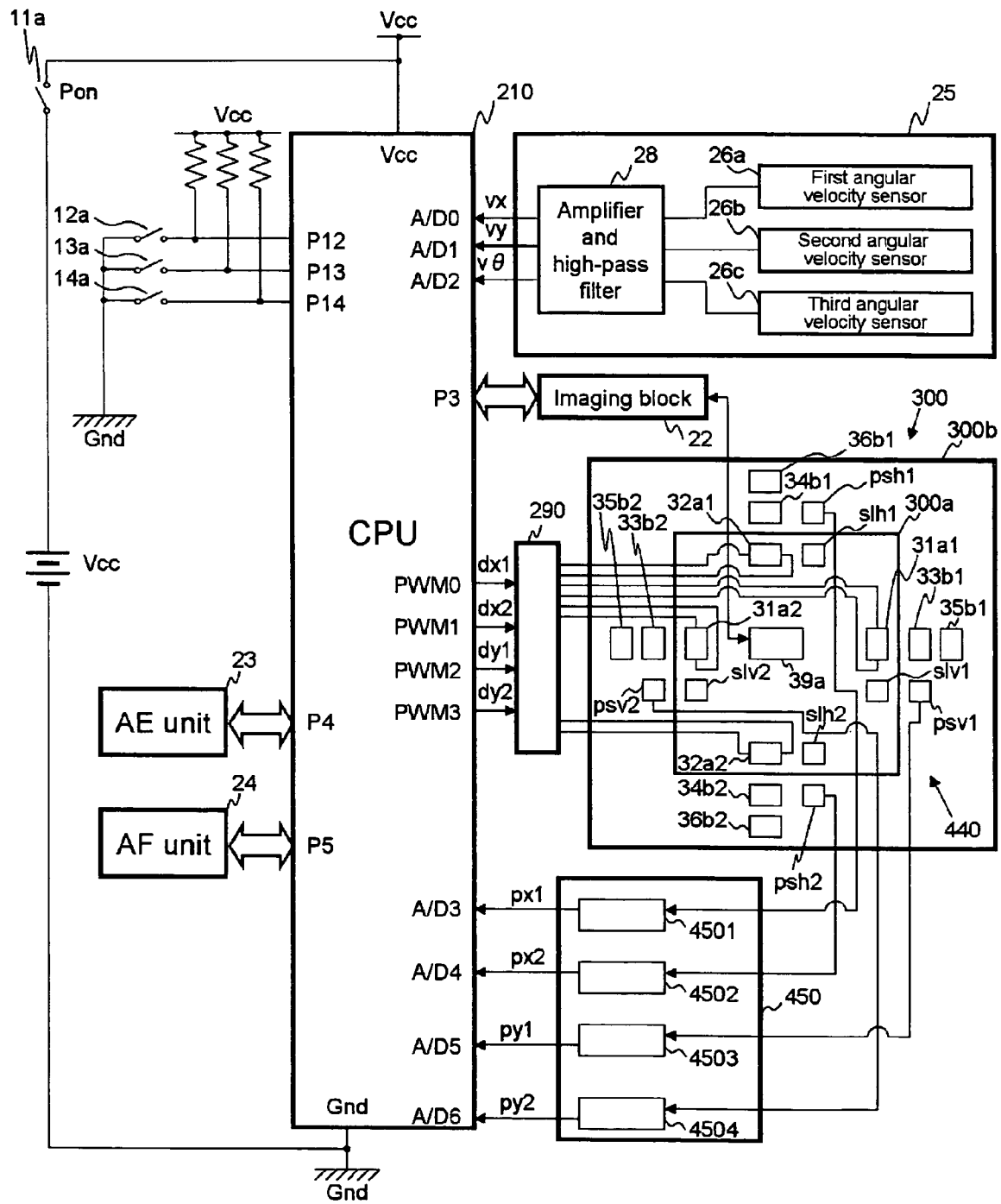
FIG. 7 is a circuit construction diagram of the photographing apparatus, in the second embodiment.

The imaging part of the photographing apparatus 1 comprises a Pon button 11, a Pon switch 11a, a photometric switch 12a, a release button 13, a release switch 13a, an indicating unit 17 such as an LCD monitor etc., a second CPU 210, an imaging block 22, an AE (automatic exposure) unit 23, an AF (automatic focusing) unit 24, an imaging unit 39a in the second anti-shake apparatus 300, and a camera lens 67 (see FIGS. 1, 2, and 7).

The second CPU 210 is a control apparatus, which controls each part of the photographing apparatus 1 regarding the imaging operation, and controls each part of the photographing apparatus 1 regarding the anti-shake operation. The anti-shake operation controls the movement of the second movable unit 300a and controls detecting the position of the second movable unit 300a.

The anti-shaking part of the photographing apparatus 1 comprises an anti-shake button 14, an anti-shake switch 14a, a second CPU 210, an angular velocity detecting unit 25, a second driver circuit 290, a second anti-shake apparatus 300, a second optical-sensor signal-processing unit 450, and the camera lens 67.

Next, the details of the input and output relationship with the second CPU 210 for the angular velocity unit 25, the second driver circuit 290, the second anti-shake apparatus 300, and the second optical-sensor signal-processing unit 450, are explained.

The angular velocity unit 25 outputs the first, second, and third angular velocities vx, vy, and vθ, to the A/D converters A/D 0, A/D 1, and A/D 2 of the second CPU 210, like the first embodiment. The second CPU 210 calculates the hand-shake quantity on the basis of the first, second, and third angular velocities vx, vy, and vθ.

The second CPU 210 calculates the position S of the imaging unit 39a (the second movable unit 300a), which should be moved to and rotated to, corresponding to the hand-shake quantity which is calculated, for the first direction x, the second direction y, and the rotation angle.

The location in the first direction x of the position S is defined as sx, and the location in the second direction y of the position S is defined as sy, and the rotation angle on the xy plane of the position S is defined as sθ. The movement of the second movable unit 300a, which includes the imaging unit 39a, is performed by using electromagnetic force and is described later. The driving force D, which drives the second driver circuit 290 in order to move and rotate the second movable unit 300a to the position S, has a first horizontal PWM duty dx1 as one of the driving-force components in the first direction x, a second horizontal PWM duty dx2 as another of the driving-force components in the first direction x, a first vertical PWM duty dy1 as one of the driving-force components in the second direction y, and a second vertical PWM duty dy2 as another of the driving-force components in the second direction y.

The second anti-shake apparatus 300 is an apparatus which corrects the hand-shake effect, by moving and rotating the imaging unit 39a to the position S, by canceling lag of the photographic subject image on the imaging surface of the imaging device 39a1, and by stabilizing the photographing subject image that reaches the imaging surface of the imaging device 39a1. This lag includes a rotation-component.

The second anti-shake apparatus 300 has a second movable unit 300a, which includes the imaging unit 39a, and a second fixed unit 300b. Or, the second anti-shake apparatus 300 is composed of a driving part which moves the second movable unit 300a by electromagnetic force to the position S, and a position-detecting part which detects the position of the second movable unit 300a (a detected-position P).

The size and the direction of the electro-magnetic force are determined by the size and the direction of the current which flows in the coil, and the size and the direction of the magnetic-field of the magnet.

The driving of the second movable unit 300a of the second anti-shake apparatus 300, is performed by the second driver circuit 290 which has the first horizontal PWM duty dx1 input from the PWM 0 of the second CPU 210 and has the second horizontal PWM duty dx2 input from the PWM 1 of the second CPU 210 and has the first vertical PWM duty dy1 input from the PWM 2 of the second CPU 210 and has the second vertical PWM duty dy2 input from the PWM 3 of the second CPU 210.

The detected-position P of the second movable unit 300a, either before moving and rotating or after moving and rotating, which is moved and rotated by driving the second driver circuit 290, is detected by the second position-detecting unit 440 and the second optical-sensor signal-processing unit 450.

Information in the first direction x for the detected-position P, in other words first and second horizontal detected-position signals px1 and px2 are input to the A/D converters A/D 3 and A/D 4 of the second CPU 210. The first horizontal detected-position signal px1 is an analogue signal, and is converted to a digital signal through the A/D converter A/D 3. (A/D converting operation). The second horizontal detected-position signal px2 is an analogue signal, and is converted to a digital signal through the A/D converter A/D 4 (A/D converting operation).

Information in the second direction y for the detected-position P, in other words first and second vertical detected-position signals py1 and py2 are input to the A/D converters A/D 5 and A/D 6 of the second CPU 210. The first vertical detected-position signal py1 is an analogue signal, and is converted to a digital signal through the A/D converter A/D 5 (A/D converting operation). The second vertical detected-position signal py2 is an analogue signal, and is converted to a digital signal through the A/D converter A/D 6 (A/D converting operation).

A first data in the first direction x for the detected-position P, after the A/D converting operation, is defined as pdx1, corresponding to the first horizontal detected-position signal px1.

A second data in the first direction x for the detected-position P, after the A/D converting operation, is defined as pdx2, corresponding to the second horizontal detected-position signal px2.

A first data in the second direction y for the detected-position P, after the A/D converting operation, is defined as pdy1, corresponding to the first vertical detected-position signal py1.

A second data in the second direction y for the detected-position P, after the A/D converting operation, is defined as pdy2, corresponding to the second vertical detected-position signal py2.

A first location in the first direction x for the detected-position P, after the calculating operation for the data pdx1, pdx2, pdy1, and pdy2, is defined as pxx.

A second location in the second direction y for the detected-position P, after the calculating operation for the data pdx1, pdx2, pdy1, and pdy2, is defined as pyy.

A rotation angle on the xy plane for the detected-position P, after the calculating operation for the data pdx1, pdx2, pdy1, and pdy2, is defined as p$\theta$.

The PID (Proportional Integral Differential) control is performed on the basis of the data for the detected-position P (pxx, pyy, p$\theta$) and the data for the position (sx, sy, s$\theta$) which should be moved to and rotated to.

The second movable unit 300a has a first vertical driving coil 31a1, a second vertical driving coil 31a2, a first horizontal driving coil 32a1, a second horizontal driving coil 32a2, an imaging unit 39a, a second slit light-source unit of a position-detecting unit 440, a second movable circuit board 490a, a first ball for movement 50a1, a second ball for movement 50a2, a fourth ball for movement 50a4, a fifth ball for movement 50a5, a first ball-bearing for movement 51a, a second ball-bearing for movement 52a, a fourth ball-bearing for movement 54a, a fifth ball-bearing for movement 55a, and a plate 64a (see FIGS. 8 and 9).

The second fixed unit 300b has a first vertical driving magnet 33b1, a second vertical driving magnet 33b2, a first horizontal driving magnet 34b1, a second horizontal driving magnet 34b2, a first vertical driving yoke 35b1, a second vertical driving yoke 35b2, a first horizontal driving yoke 36b1, a second horizontal position-detecting yoke 36b2, a second optical sensor unit of the second position-detecting unit 440, a second base board 650b, and a second sensor circuit board 660b.

The second movable unit 300a contacts the second fixed unit 300b, through the first, second, fourth and fifth balls 50a1, 50a2, 50a4, and 50a5. The first ball for movement 50a1 can roll between the first ball-bearing for movement 51a and the second base board 650b. The second ball for movement 50a2 can roll between the second ball-bearing for movement 52a and the second base board 650b. The fourth ball for movement 50a4 can roll between the fourth ball-bearing for movement 54a and the second base board 650b. The fifth ball for movement 50a5 can roll between the fifth ball-bearing for movement 55a and the second base board 650b.

The contacted situation of the second movable unit 300a and the second fixed unit 300b is kept through the first, second, fourth, and fifth balls 50a1, 50a2, 50a4, and 50a5.

The second movable unit 300a is urged in the third direction z, by an urging member such as a spring etc., which is fixed in the photographing apparatus 1. Therefore, the movable and rotatable situation of the second movable unit 300a on the xy plane is maintained. Or, the second fixed unit 300b supports the second movable unit 300a in the movable and rotatable situation.

The location relation between the second movable unit 300a and the second fixed unit 300b in the second embodiment is the same as the location relation between the first movable unit 30a and the first fixed unit 30a in the first embodiment.

The imaging unit 39a, the plate 64a, and the second movable circuit board 490a are attached, in this order along the optical axis LX direction, viewed from the side of the camera lens 67, like the first embodiment. The constructions of the imaging unit 39a and the plate 64a in the second embodiment, are the same as those of the first embodiment. The first, second, fourth, and fifth ball-bearings 51a, 52a, 54a, and 55a are attached to the stage 39a2.

The first vertical driving coil 31a1, the second vertical driving coil 31a2, the first horizontal driving coil 32a1, and the second horizontal driving coil 32a2, are attached to the second movable circuit board 490a.

The coil patterns of the first and second vertical driving coils 31a1 and 31a2, and the location relations between the optical axis LX and the first and second vertical driving coils 31a1 and 31a2, are the same as those of the first embodiment.

The first horizontal driving coil 32a1 forms a seat and a spiral shape coil pattern. The coil pattern of the first horizontal driving coil 32a1 has a line segment which is parallel to the second direction y, before the second movable unit 300a is rotated. The second movable unit 300a which includes the first horizontal driving coil 32a1, is moved in the first direction x, by the third electromagnetic force Pw3. The line segment which is parallel to the second direction y, is used for moving the second movable unit 300a in the first direction x. The line segment which is parallel to the second direction y, has a fourth effective length L4.

The third electro-magnetic force Pw3 occurs on the basis of the current direction of the first horizontal driving coil 32a1 and the magnetic-field direction of the first horizontal driving magnet 34b1.

The second horizontal driving coil 32a2 forms a seat and a spiral shape coil pattern. The coil pattern of the second horizontal driving coil 32a2 has a line segment which is parallel to the second direction y, before the second movable unit 300a is rotated. The second movable unit 300a which includes the second horizontal driving coil 32a2, is moved in the first direction x, by the fourth electro-magnetic force Pw4. The line segment which is parallel to the second direction y, are used for moving the second movable unit 300a in the first direction x. The line segment which is parallel to the second direction y, has a fifth effective length L5.

The fourth electro-magnetic force Pw4 occurs on the basis of the current direction of the second horizontal driving coil 32a2 and the magnetic-field direction of the second horizontal driving magnet 34b2.

In the second embodiment, the first vertical driving coil 31a1 is attached to the right edge area of the second movable circuit board 490a (one of the edge areas of the second movable circuit board 490a in the first direction x), viewed from the third direction z and from the opposite side of the camera lens 67.

Similarly, the second vertical driving coil 31a2 is attached to the left edge area of the second movable circuit board 490a (another of the edge areas of the second movable circuit board 490a in the first direction x), viewed from the third direction z and from the opposite side of the camera lens 67.

Similarly, the first horizontal driving coil 32a1 is attached to the upper area of the second movable circuit board 490a (one of the edge areas of the second movable circuit board 490a in the second direction y), viewed from the third direction z and from the opposite side of the camera lens 67.

Similarly, the second horizontal driving coil 32a2 is attached to the lower area of the second movable circuit board 490a (one of the edge areas of the second movable circuit board 490a in the second direction y), viewed from the third direction z and from the opposite side of the camera lens 67.

The imaging device 39a1 is attached to the middle area of the second movable circuit board 49a between the first and second vertical driving coils 31a1 and 31a2, in the first direction x, and between the first and second horizontal driving coils 32a1 and 32a2, in the second direction y.

The first and second vertical driving coils 31a1 and 31a2 and the first and second horizontal driving coils 32a1 and 32a2, and the imaging device 39a1 are attached on the same side of the second movable circuit board 490a.

The location relation between the first and second horizontal driving coils 32a1 and 32a2 is set up so that the optical axis LX is located between the first and second horizontal driving coils 32a1 and 32a2 in the second direction y, before the second movable unit 300a is rotated. In other words, the first and second horizontal driving coils 32a1 and 32a2 are arranged in a symmetric position centering on the optical axis LX. Therefore, the second movable unit 300a can be rotated around an intersection area between the xy plane and the optical axis LX, in other words a center area of the imaging device 39a1, by the third and fourth electro-magnetic forces Pw3 and Pw4. Further, even if the direction of the third electro-magnetic force Pw3 is opposite to or the same as the direction of the fourth electro-magnetic force Pw4, when the quantity of the third electromagnetic force Pw3 is different from the quantity of the fourth electromagnetic force Pw4, the second movable unit 300a can be rotated.

The first and second horizontal driving coils 32a1 and 32a2 are arranged on the second movable circuit board 490a, where a distance between the center of the imaging device 39a1 and the center area of the first horizontal driving coil 32a1 is the same as a distance between the center of the imaging device 39a1 and the center area of the second horizontal driving coil 32a2.

Because the two coils (31a1 and 31a2) are used for moving the second movable unit 300a in the second direction y and because the two coils (32a1 and 32a2) are used for moving the second movable unit 300a in the first direction x and because the second movable unit 300a is movable and rotatable on the xy plane relative to the second fixed unit 300b by the first, second, fourth, and fifth balls 50a1, 50a2, 50a4, and 50a5, the second movable unit 300a can be moved and rotated on the xy plane by the first and second vertical driving coils 31a1 and 31a2 and the first and second horizontal driving coils 32a1 and 32a2, relative to the second fixed unit 300b.

Further, because the first and second horizontal driving coils 32a1 and 32a2 and the first and second vertical driving coils 31a1 and 31a2 are seat coils, the thickness of each coil in the third direction z can be small. Accordingly, even if the first and second horizontal driving coils 32a1 and 32a2 and the first and second vertical driving coils 31a1 and 31a2 are composed of a plurality of seat coils which are layered in the third direction z, for increasing the electro-magnetic force, the thickness of each coil in the third direction z hardly increases. Therefore, the second anti-shake apparatus 300 can be downsized by restraining the distance between the second movable unit 300a and the second fixed unit 300b.

The first and second vertical driving coils 31a1 and 31a2 and the first and second horizontal driving coils 32a1 and 32a2 are connected with the second driver circuit 290 which drives the first and second vertical driving coils 31a1 and 31a2 and the first and second horizontal driving coils 32a1 and 32a2 through the flexible circuit board (not depicted). The first horizontal PWM duty dx1 is input to the second driver circuit 290 from the PWM 0 of the second s CPU 210, and the second horizontal PWM duty dx2 is input to the second driver circuit 290 from the PWM 1 of the second CPU 210, and the first vertical PWM duty dy1 is input to the second driver circuit 290 from the PWM 2 of the second CPU 210, and the second vertical PWM duty dy2 is input to the second driver circuit 290 from the PWM 3 of the second CPU 210. The second driver circuit 290 supplies power to the first horizontal driving coil 32a1 corresponding to the value of the first horizontal PWM duty dx1, and to the second horizontal driving coil 32a2 corresponding to the value of the second horizontal PWM duty dx2, and to the first vertical driving coil 31a1 corresponding to the value of the first vertical PWM duty dy1, and to the second vertical driving coil 31a2 corresponding to the value of the second vertical PWM duty dy2, to drive (move and rotate) the second movable unit 300a.

When the second movable unit 300a is moved in the second direction y, the second CPU 210 controls the values of the first and second vertical PWM duties dy1 and dy2 where the direction of the first electro-magnetic force Pw1 is the same as the direction of the second electromagnetic force Pw2 and where the quantity of the first electromagnetic force Pw1 is the same as the quantity of the second electro-magnetic force Pw2.

When the second movable unit 300a is moved in the first direction x, the second CPU 210 controls the values of the first and second horizontal PWM duties dx1 and dx2 where the direction of the third electro-magnetic force Pw3 is the same as the direction of the fourth electro-magnetic force Pw4 and where the quantity of the third electro-magnetic force Pw3 is the same as the quantity of the fourth electromagnetic force Pw4.

When the second movable unit 300a is rotated on the xy plane, the second CPU 210 controls the values of the first and second vertical PWM duties dy1 and dy2 where the direction of the first electromagnetic force Pw1 is opposite to the direction of the second electromagnetic force Pw2 and where the quantity of the first electromagnetic force Pw1 is the same as the quantity of the second electro-magnetic force Pw2, or controls the values of the first and second horizontal PWM duties dx1 and dx2 where the direction of the third electromagnetic force Pw3 is opposite to the direction of the fourth electro-magnetic force Pw4 and where the quantity of the third electro-magnetic force Pw3 is the same as the quantity of the fourth electro-magnetic force Pw4.

When the second movable unit 300a is moved in the second direction y and rotated on the xy plane, the second CPU 210 controls the values of the first and second vertical PWM duties dy1 and dy2 where the direction of the first electro-magnetic force Pw1 is the same as the direction of the second electro-magnetic force Pw2 and where the quantity of the first electromagnetic force Pw1 is different from the quantity of the second electro-magnetic force Pw2.

When the second movable unit 300a is moved in the first direction x and rotated on the xy plane, the second CPU 210 controls the values of the first and second horizontal PWM duties dx1 and dx2 where the direction of the third electromagnetic force Pw3 is the same as the direction of the fourth electromagnetic force Pw4 and where the quantity of the third electro-magnetic force Pw3 is different from the quantity of the fourth electromagnetic force Pw4.

The constructions of the first and second vertical driving magnets 33b1 and 33b2 are the same as those of the first embodiment.

The first horizontal driving magnet 34b1 is attached to the first horizontal driving yoke 36b1, under the condition where the N pole and S pole are arranged in the first direction x. The first horizontal driving yoke 36b1 is attached to the second base board 650*b* of the second fixed unit 300*b*, on the side of the second movable unit 300*a*, in the third direction z.

The length of the first horizontal driving magnet 34*b*1 in the second direction y, is longer in comparison with the fourth effective length L4 of the first horizontal driving coil 32*a*1. The magnetic-field which influences the first horizontal driving coil 32*a*1 is not changed during movement of the second movable unit 300*a* in the second direction y.

The second horizontal driving magnet 34*b*2 is attached to the second horizontal driving yoke 36*b*2, under the condition where the N pole and S pole are arranged in the first direction x. The second horizontal driving yoke 36*b*2 is attached to the second base board 650*b* of the second fixed unit 300*b*, on the side of the second movable unit 300*a*, in the third direction z.

The length of the second horizontal driving magnet 34*b*2 in the second direction y, is longer in comparison with the fifth effective length L5 of the second horizontal driving coil 32*a*2. The magnetic-field which influences the second horizontal driving coil 32*a*2 is not changed during movement of the second movable unit 300*a* in the second direction y.

The constructions of the first and second vertical driving yokes 35*b*1 and 35*b*2 are the same as those of the first embodiment.

The first horizontal driving yoke 36*b*1 is made of a soft magnetic material, and forms a square-u-shape channel when viewed from the first direction x. The first horizontal driving magnet 34*b*1 and the first horizontal driving coil 32*a*1 are inside the channel of the first horizontal driving yoke 36*b*1.

The side of the first horizontal driving yoke 36*b*1, which contacts the first horizontal driving magnet 34*b*1, prevents the magnetic-field of the first horizontal driving magnet 34*b*1 from leaking to the surroundings.

The other side of the first horizontal driving yoke 36*b*1 (which faces the first horizontal driving magnet 34*b*1, the first horizontal driving coil 32*a*1, and the second movable circuit board 490*a*) raises the magnetic-flux density between the first horizontal driving magnet 34*b*1 and the first horizontal driving coil 32*a*1.

The second horizontal driving yoke 36*b*2 is made of a soft magnetic material, and forms a square-u-shape channel when viewed from the first direction x. The second horizontal driving magnet 34*b*2 and the second horizontal driving coil 32*a*2 are inside the channel of the second horizontal driving yoke 36*b*2.

The side of the second horizontal driving yoke 36*b*2, which contacts the second horizontal driving magnet 34*b*2, prevents the magnetic-field of the second horizontal driving magnet 34*b*2 from leaking to the surroundings.

The other side of the second horizontal driving yoke 36*b*2 (which faces the second horizontal driving magnet 34*b*2, the second horizontal driving coil 32*a*2, and the second movable circuit board 490*a*) raises the magnetic-flux density between the second horizontal driving magnet 34*b*2 and the second horizontal driving coil 32*a*2.

The second position-detecting unit 440 has a second slit light-source unit and a second optical sensor unit.

The second slit light-source unit is a light source which radiates a linear-shaped light, such as an LED, and has a first horizontal slit light-source slh1, a second horizontal slit light-source slh2, a first vertical slit light-source slv1, and a second vertical slit light-source slv2. The second slit light-source unit is attached to the second movable circuit board 490*a* of the second movable unit 300*a*.

The second optical sensor unit is a semiconductor element which has a linear-shaped receiving surface, such as a position sensitive detector (PSD). The second optical sensor unit can detect locations of the points (A', B', C', and D') which receives light from the second slit light-source unit.

The received light from the second slit light-source, being a light-pulse, flows through the terminals of the second optical sensor unit, so that the information of the position is converted to a voltage (photoelectric conversion).

The second optical sensor unit has a first horizontal position-detecting element psh1, a second horizontal position-detecting element psh2, a first vertical position-detecting element psv1, and a second vertical position-detecting element psv2. The second optical sensor unit is attached to the second sensor circuit board 660*b* of the second fixed unit 300*b*.

In FIG. 7, cables between each component of the second slit light-source unit and the power supply are omitted.

The first horizontal position-detecting element psh1 has a linear-shaped receiving surface which is parallel to the first direction x. The second horizontal position-detecting element psh2 has a linear-shaped receiving surface which is parallel to the first direction x. The first vertical position-detecting element psv1 has a linear-shaped receiving surface which is parallel to the second direction y. The second vertical position-detecting element psv2 has a linear-shaped receiving surface which is parallel to the second direction y.

The first and second horizontal slit light-sources slh1 and slh2 are arranged on the second movable circuit board 490*a* so that the first and second horizontal slit light-sources slh1 and slh2 radiate linear-shaped light in the second direction y before the second movable unit 300*a* is rotated.

The first and second vertical slit light-sources slv1 and slv2 are arranged on the second movable circuit board 490*a* so that the first and second vertical slit light-sources slv1 and slv2 radiate linear-shaped light in the first direction x before the second movable unit 300*a* is rotated.

The first horizontal position-detecting element psh1 is arranged on the second sensor circuit board 660*b* so that the first horizontal position-detecting element psh1 is parallel to the first direction x before the second movable unit 300*a* is rotated, and faces the first horizontal slit light-source slh1 in the third direction z.

The second horizontal position-detecting element psh2 is arranged on the second sensor circuit board 660*b* so that the second horizontal position-detecting element psh2 is parallel to the first direction x before the second movable unit 300*a* is rotated, and faces the second horizontal slit light-source slh2 in the third direction z.

The first vertical position-detecting element psv1 is arranged on the second sensor circuit board 660*b* so that the first vertical position-detecting element psv1 is parallel to the second direction y before the second movable unit 300*a* is rotated, and faces the first vertical slit light-source slv1 in the third direction z.

The second vertical position-detecting element psv2 is arranged on the second sensor circuit board 660*b* so that the second vertical position-detecting element psv2 is parallel to the second direction y before the second movable unit 300*a* is rotated, and faces the second vertical slit light-source slv2 in the third direction z.

The first horizontal slit light-source slh1 and the first horizontal driving coil 32*a*1 are arranged in the second direction y.

The second horizontal slit light-source slh2 and the second horizontal driving coil 32*a*2 are arranged in the second direction y.

The first vertical slit light-source slv1 and the first vertical driving coil 31*a*1 are arranged in the first direction x, like that of the first embodiment.

The second vertical slit light-source slv2 and the second vertical driving coil 31*a*2 are arranged in the first direction x, like that of the first embodiment.

The first horizontal position-detecting element psh1 faces the first horizontal slit light-source slh1 in the third direction z, and crosses the first horizontal slit light-source slh1 at a point A' when viewed from the third direction z.

The second horizontal position-detecting element psh2 faces the second horizontal slit light-source slh2 in the third direction z, and crosses the second horizontal slit light-source slh2 at a point B' when viewed from the third direction z.

The first vertical position-detecting element psv1 faces the first vertical slit light-source slv1 in the third direction z, and crosses the first vertical slit light-source slv1 at a point C' when viewed from the third direction z, like that of the first embodiment.

The second vertical position-detecting element psv2 faces the second vertical slit light-source slv2 in the third direction z, and crosses the second vertical slit light-source slv2 at a point D' when viewed from the third direction z, like that of the first embodiment.

In the second embodiment, the first vertical slit light-source slv1 is attached to the right edge area of the second movable circuit board 490$a$ (one of the edge areas of the second movable circuit board 490$a$ in the first direction x), viewed from the third direction z and from the opposite side of the camera lens 67.

Similarly, the second vertical slit light-source lsv2 is attached to the left edge area of the second movable circuit board 490$a$ (another of the edge areas of the second movable circuit board 490$a$ in the first direction x), viewed from the third direction z and from the opposite side of the camera lens 67.

Similarly, the first horizontal slit light-source slh1 is attached to the upper area of the second movable circuit board 490$a$ (one of the edge areas of the second movable circuit board 490$a$ in the second direction y) viewed from the third direction z and from the opposite side of the camera lens 67.

Similarly, the second horizontal slit light-source slh2 is attached to the lower area of the second movable circuit board 490$a$ (one of the edge areas of the second movable circuit board 490$a$ in the second direction y), viewed from the third direction z and from the opposite side of the camera lens 67.

The first and second vertical slit light-sources slv1 and slv2 and the first and second horizontal slit light-sources slh1 and slh2 are attached on the same side of the second movable circuit board 490$a$. The first vertical slit light-source slv1 and the imaging device 39$a$1 are attached on the opposite side of the second movable circuit board 490$a$.

The location relation between the first and second vertical slit light-sources slv1 and slv2 is set up so that the optical axis LX is located between the first and second vertical slit light-sources slv1 and slv2 in the first direction x, before the second movable unit 300$a$ is rotated. In other words, the first and second vertical slit light-sources slv1 and slv2 are arranged in a symmetric position centering on the optical axis LX (or a center area of the imaging device 39$a$1).

The location relation between the first and second horizontal slit light-sources slh1 and slh2 is set up so that the optical axis LX is located between the first and second horizontal slit light-sources slh1 and slh2 in the second direction y, before the second movable unit 30$a$ is rotated. In other words, the first and second horizontal slit light-sources slh1 and slh2 are arranged in a symmetric position centering on the optical axis LX (or the center area of the imaging device 39$a$1).

It is desirable that the first and second horizontal slit light-sources slh1 and slh2 are arranged on the second movable circuit board 490$a$, where a distance between the center of the imaging device 39$a$1 and the center area of the first horizontal slit light-source slh1 is the same as a distance between the center of the imaging device 39$a$1 and the center area of the second horizontal slit light-source slh2, in order to simplify the calculation of the position-detecting operation.

It is desirable that the first and second vertical slit light-sources slv1 and slv2 are arranged on the first movable circuit board 49$a$, where a distance between the center of the imaging device 39$a$1 and the center area of the first vertical slit light-source slv1 is the same as a distance between the center of the imaging device 39$a$1 and the center area of the second vertical slit light-source slv2, in order to simplify the calculation of the position-detecting operation.

The above described location relation between the second slit light-source unit and the second optical sensor unit is kept, when the second movable unit 300$a$ is in any position in its movement range.

It is desirable that the point A' is in an intermediate area of the first horizontal position-detecting element psh1 in the first direction x, and in an intermediate area of the first horizontal slit light-source slh1 in the second direction y, before the second movable unit 300$a$ is moved and rotated (in an initial state), in other words the first horizontal slit light-source slh1 crosses the first horizontal position-detecting element psh1 at the intermediate area of the first horizontal position-detecting element psh1 in the first direction x, and at the intermediate area of the first horizontal slit light-source slh1 in the second direction y, in the initial state. That is, the first horizontal position-detecting element psh1 detects the position at the intermediate area of the first horizontal position-detecting element psh1 in the first direction x in the initial state.

Similarly, it is desirable that the point B' is in an intermediate area of the second horizontal position-detecting element psh2 in the first direction x, and in an intermediate area of the second horizontal slit light-source slh2 in the second direction y, in the initial state, in other words the second horizontal slit light-source slh2 crosses the second horizontal position-detecting element psh2-at the intermediate area of the second horizontal position-detecting element psh2 in the first direction x, and at the intermediate area of the second horizontal slit light-source slh2 in the second direction y, in the initial state. That is, the second horizontal position-detecting element psh2 detects the position at the intermediate area of the second horizontal position-detecting element psh2 in the first direction x in the initial state.

Similarly, it is desirable that the point C' is in an intermediate area of the first vertical position-detecting element psv1 in the second direction y, and in an intermediate area of the first vertical slit light-source slv1 in the first direction x, in the initial state, in other words the first vertical slit light-source slv1 crosses the first vertical position-detecting element psv1 at the intermediate area of the first vertical position-detecting element psv1 in the second direction y, and at the intermediate area of the first vertical slit light-source slv1 in the first direction x, in the initial state. That is, the first vertical position-detecting element psv1 detects the position at the intermediate area of the first vertical position-detecting element psv1 in the second direction y in the initial state, like that of the first embodiment.

Similarly, it is desirable that the point D' is in an intermediate area of the second vertical position-detecting element psv2 in the second direction y, and in an intermediate area of the second vertical slit light-source slv2 in the first direction x, in the initial state, in other words the second vertical slit light-source slv2 crosses the second vertical position-detecting element psv2 at the intermediate area of the second vertical position-detecting element psv2 in the second direction y, and at the intermediate area of the second vertical slit light-source slv2 in the first direction x, in the initial state. That is, the second vertical position-detecting element psv2 detects the position at the intermediate area of the second vertical position-detecting element psv2 in the second direction y in the initial state, like that of the first embodiment.

Both the second base board 650b and the second sensor circuit board 660b are plate state members which become the base for attaching the first horizontal driving yoke 36b1 etc., and are arranged being parallel to the imaging surface of the imaging device 39a1. The second sensor circuit board 660b is positioned such that the second optical sensor unit and the second slit light-source unit are between the second sensor circuit board 660b and the imaging device 39a1 in the third direction z (see FIG. 8).

In the second embodiment, the second base board 650b is arranged at the side nearer to the camera lens 67 in comparison with the second movable circuit board 490a, in the third direction z. However, the second movable circuit board 490a may be arranged at the side nearer to the camera lens 67 in comparison with the second base board 650b.

The second optical-sensor signal-processing unit 450 has a fourth optical-sensor signal-processing circuit 4501 and a fifth optical-sensor signal-processing circuit 4502 and a sixth optical-sensor signal-processing circuit 4503 and a seventh optical-sensor signal-processing circuit 4504.

The fourth optical-sensor signal-processing circuit 4501 detects a first horizontal potential-difference (as one part of the first position-information) between the output terminals of the first horizontal position-detecting element psh1, based on an output signal of the first horizontal position-detecting element psh1.

The fourth optical-sensor signal-processing circuit 4501 outputs the first horizontal detected-position signal px1 to the A/D converter A/D 3 of the second CPU 210, on the basis of the first horizontal potential-difference. The first horizontal detected-position signal px1 specifies a location of the part of the second movable unit 300a which has the first horizontal slit light-source slh1, and of the point A' where the first horizontal slit light-source slh1 crosses the first horizontal position-detecting element psh1 in the first direction x, when viewed from the third direction z.

The fourth optical-sensor signal-processing circuit 4501 is connected with the first horizontal position-detecting element psh1.

The fifth optical-sensor signal-processing circuit 4502 detects a second horizontal potential-difference (as one part of the first position-information) between the output terminals of the second horizontal position-detecting element psh2, based on an output signal of the second horizontal position-detecting element psh2.

The fifth optical-sensor signal-processing circuit 4502 outputs the second horizontal detected-position signal px2 to the A/D converter A/D 4 of the second CPU 210, on the basis of the second horizontal potential-difference. The second horizontal detected-position signal px2 specifies a location of the part of the second movable unit 300a which has the second horizontal slit light-source slh2, and of the point B' where the second horizontal slit light-source slh2 crosses the second horizontal position-detecting element psh2 in the first direction x, when viewed form the third direction z.

The fifth optical-sensor signal-processing circuit 4502 is connected with the second horizontal position-detecting element psh2.

The sixth optical-sensor signal-processing circuit 4503 detects a first vertical potential-difference (as one part of the second position-information) between the output terminals of the first vertical position-detecting element psv1, based on an output signal of the first vertical position-detecting element psv1.

The sixth optical-sensor signal-processing circuit 4503 outputs the first vertical detected-position signal py1 to the A/D converter A/D 5 of the second CPU 210, on the basis of the first vertical potential-difference. The first vertical detected-position signal py1 specifies a location of the part of the second movable unit 300a which has the first vertical slit light-source slv1, and of the point C' where the first vertical slit light-source slv1 crosses the first vertical position-detecting element psv1 in the second direction y, when viewed from the third direction z.

The sixth optical-sensor signal-processing circuit 4503 is connected with the first vertical position-detecting element psv1.

The seventh optical-sensor signal-processing circuit 4504 detects a second vertical potential-difference (as one part of the second position-information) between the output terminals of the second vertical position-detecting element psv2, based on an output signal of the second vertical position-detecting element psv2.

The seventh optical-sensor signal-processing circuit 4504 outputs the second vertical detected-position signal py2 to the A/D converter A/D 6 of the second CPU 210, on the basis of the second vertical potential-difference. The second vertical detected-position signal py2 specifies a location of the part of the second movable unit 300a which has the second vertical slit light-source slv2, and of the point D' where the second vertical slit light-source slv2 crosses the second vertical position-detecting element psv2 in the second direction y, when viewed from the third direction z.

The seventh optical-sensor signal-processing circuit 4504 is connected with the second vertical position-detecting element psv2.

In the second embodiment, the four position-detecting elements (psh1, psh2, psv1 and psv2) are used for specifying the location of the second movable unit 300a which includes the rotation angle.

By using two of the four position-detecting elements (psv1 and psv2), the locations in the second direction y of the two points (the points C' and D') on the second movable unit 300a are specified. By using the other two of the four position-detecting elements (psh1 and psh2), the locations in the first direction x of the two points (the points A' and B') on the second movable unit 300a are specified. The location of the second movable unit 300a which includes the rotation angle on the xy plane, can be specified on the basis of the information regarding the locations in the first direction x of the two points (A and B) and the locations in the second direction y of the two points (C and D).

Figure 10:
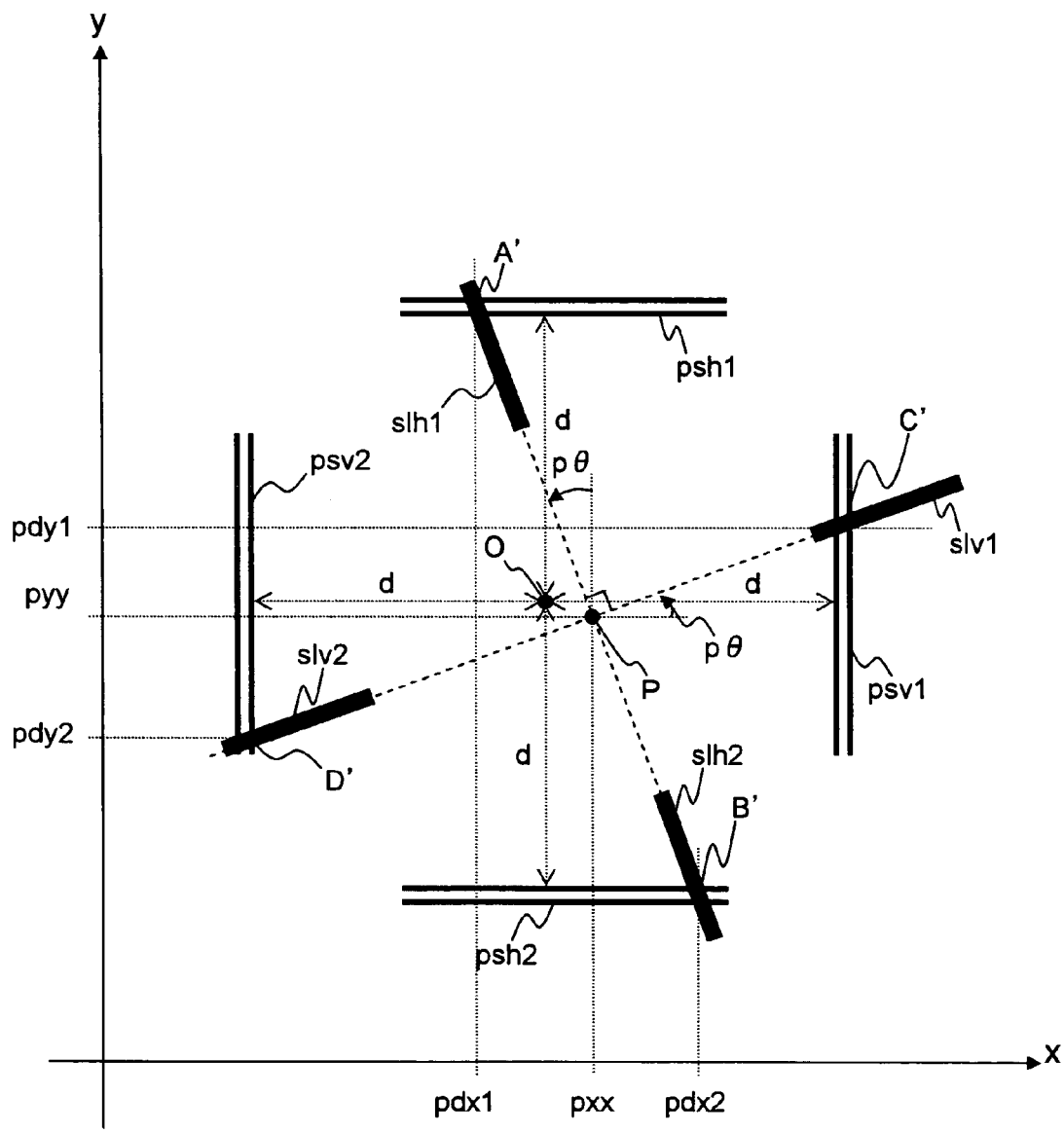
FIG. 10 is an example where the location of the point P is calculated on the basis of location-information of a point A', a point B', a point C', and a point D' on the movable unit, in the second embodiment.

An example is explained using FIG. 10. The location of the point P (pxx, pyy, pθ) is calculated on the basis of the location-information of a point A', a point B', a point C', and a point D' on the second movable unit 300a.

The point A' is a point where the first horizontal slit light-source slh1 crosses the first horizontal position-detecting element psh1 when viewed from the third direction z. The point B' is a point where the second horizontal slit light-source slh2 crosses the second horizontal position-detecting element psh2 when viewed from the third direction z. The point C' is a point where the first vertical slit light-source slv1 crosses the first vertical position-detecting element psv1 when viewed from the third direction z. The point D' is a point where the second vertical slit light-source slv2 crosses the second position-detecting element psv2 when viewed from the third direction z.

The lengths of the segments A'B' and C'D' are changed corresponding to the value of the rotation angle pθ.

The point P is defined as an intersection point between a segment A'B' and a segment C'D'. The segment A'B' is perpendicular to the segment C'D'.

The first and second horizontal light-sources slh1 and slh2, the first and second vertical light-sources slv1 and slv2, and the imaging device 39a1 are arranged on the second movable circuit board 490a where the point P agrees with a center of the imaging device 39a1 in the third direction z, in the initial state. In the example of the second embodiment, a location relation in the initial state between the second movable unit 330a and the second fixed unit 300b is set so that a length between the center point o of the imaging device 39a1 and the first horizontal position-detecting element psh1, a length between the center point O and the second horizontal position-detecting element psh2, a length between the center point O and the first vertical position-detecting element psv1, and a length between the center point O and the second vertical position-detecting element psv2 have same value d, in order to simplify the calculation.

The location in the first direction x of the point A' is detected by the first horizontal position-detecting element psh1, as the first horizontal detected-position signal px1. The location in the first direction x of the point B' is detected by the second horizontal position-detecting element psh2, as the second horizontal detected-position signal px2. The location in the second direction y of the point C' is detected by the first vertical position-detecting element psv1, as the first vertical detected-position signal py1. The location in the second direction y of the point D' is detected by the second vertical position-detecting element psv2, as the second vertical detected-position signal py2.

The data for the position P (pxx, pyy, pθ) are calculated on the basis of the data pdx1 which is converted from the first horizontal detected-position signal px1 in the A/D converting operation, the data pdx2 which is converted from the second horizontal detected-position signal px2 in the A/D converting operation, the data pdy1 which is converted from the first vertical detected-position signal py1 in the A/D converting operation, and the data pdy2 which is converted from the second vertical detected-position signal py2 in the A/D converting operation, and the length d, where $pxx=\{pdx1+pdx2-(pdy1+pdy2)\times\tan(p\theta)\}/2/\{1+\tan^2(p\theta)\}$, $pyy=\{(pdx1+pdx2)\times\tan(p\theta)+(pdy1+pdy2)\}/2/\{1+\tan^2(p\theta)\}$, and $p\theta=\tan^{-1}\{(pdy1-pdy2)/2d\}$. The rotation angle pθ is an angle between the first vertical slit light-source slv1 and the first direction x or between the first horizontal slit light-source slh1 and the second direction y.

In the first and second embodiments, the movable unit (30a and 300a) can be rotated on the xy plane, by the coils and the magnets and the yokes which are used for moving the movable unit (30a and 300a) in the first direction x or the second direction y. Accordingly, the moving apparatus for performing the rotational component of the anti-shake operation for the photographing apparatus, and the moving apparatus for performing the linear movement component of the anti-shake operation for the photographing apparatus, become one body. Therefore, the anti-shake apparatus can be downsized.

Further, the rotation angle of the movable unit (30a and 300a) can be detected, by the position-detecting elements and the slit light-sources which are used for detecting the location of the movable unit (30a and 300a) in the first direction x or the second direction y. Accordingly, the position-detecting apparatus for detecting the rotation angle for performing the anti-shake operation for the photographing apparatus, and the position-detecting apparatus for detecting the linear movement for performing the anti-shake operation for the photographing apparatus, become one body. Therefore, the anti-shake apparatus can be downsized.

In the first embodiment, the number of points on the first movable unit 30a which receive the electromagnetic force is 3. In the second embodiment, the number of points on the second movable unit 300a which receive the electro-magnetic force is 4. However, the number of points on the first movable unit 30a (or the second movable unit 300a) which receive the electro-magnetic force may be equal to or more than 3, under the condition where the number of points on the movable unit which receive the electro-magnetic force in one of the first direction x and the second direction y, is equal to or more than 2, and where the number of points on the movable unit which receive the electro-magnetic force in another of the first direction x and the second direction y, is equal to or more than 1.

In the first embodiment, the number of points on the first movable unit 30a which are used for the position-detecting operation, is 3. In the second embodiment, the number of points on the second movable unit 300a which are used for the position-detecting operation, is 4. However, the number of the points on the first movable unit 30a (or the second movable unit 300a) which are used for the position-detecting operation, may be equal to or more than 3, under the condition that the number of points on the movable unit which are used for the position-detecting operation in one of the first direction x and the second direction y, is equal to or more than 2, and where the number of points on the movable unit which are used for the position-detecting operation in another of the first direction x and the second direction y is equal to or more than 1.

It is explained that the first movable unit 30a (or the second movable unit 300a) has the imaging device 39a1. However, the first movable unit 30a (or the second movable unit 300a) may have a hand-shake correcting lens instead of the imaging device.

Further, it is explained that the driving coils (the first vertical driving coil 31a1 etc.) are attached to the first movable unit 30a (or the second movable unit 300a) and the driving magnets (the first vertical driving magnet 33b1 etc.) are attached to the first fixed unit 30b (or the second fixed unit 300b), however the driving coils may be attached to the fixed unit and the driving magnets may be attached to the movable unit.

Further, it is explained that the slit light-source unit is attached to the first movable unit 30a (or the second movable unit 300a) and the optical sensor unit is attached to the first fixed unit 30b (or the second fixed unit 300b), however the slit light-source unit may be attached to the fixed unit and the optical sensor unit may be attached to the movable unit.

The magnet which generates a magnetic-field, may be a permanent magnet which always generates the magnetic-field, or an electric magnet which generates the magnetic-field when it is needed.

Further, the first movable unit 30a (or the second movable unit 300a) is movable in the first direction x and the second direction y and rotatable on the xy plane, relative to the first fixed unit 30b (or the second fixed unit 300b), so that the position-detecting operation is performed by detecting the position of the movable unit in the first direction x (the first position-information), and in the second direction y (the second position-information). However, any other methods (or means) for moving the movable unit 30a on a plane which is perpendicular to the third direction z (the optical axis LX), and for detecting the movable unit 30a on the plane, are acceptable.

For example, the movement of the movable unit may only be in one dimension, so that the movable unit can be moved only in the first direction x (not the second direction y) and be rotated on the xy plane. In this case, the parts regarding the movement of the movable unit in the second direction y and regarding the position-detecting operation of the movable unit in the second direction y, such as the first vertical position-detecting element psv1 etc., may be omitted (see FIG. 3 etc.).

Although these embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2004-172314 (filed on Jun. 10, 2004), which is expressly incorporated herein by reference, in its entirety.

The invention claimed is:

1. An anti-shake apparatus of a photographing apparatus, comprising:

a movable unit that has one of an imaging device and a hand-shake correcting lens and that can be moved and rotated on a plane which is perpendicular to an optical axis of a camera lens of said photographing apparatus; and a fixed unit that supports said movable unit in a movable and rotatable situation on said plane;

said movable unit and said fixed unit having a position-detecting apparatus that detects first position-information of said movable unit in a first direction being perpendicular to said optical axis, and detect second position-information of said movable unit in a second direction being perpendicular to said optical axis and said first direction;

one of said movable unit and said fixed unit having an optical sensor unit that has one or more position-detecting elements which are used for detecting said first position-information, as said position-detecting apparatus, and that has two or more position-detecting elements which are used for detecting said second position-information, as said position-detecting apparatus;

another of said movable unit and said fixed unit having a slit light-source unit that has one or more slit light-sources which are used for detecting said first position-information, as said position-detecting apparatus, and that has two or more slit light-sources which are used for detecting said second position-information, as said position-detecting apparatus;

a number of said position-detecting elements which are used for detecting said first position-information being the same as a number of said slit light-sources which are used for detecting said first position-information; and a number of said position-detecting elements which are used for detecting said second position-information being the same as a number of said slit light-sources which are used for detecting said second position-information.

2. The anti-shake apparatus according to claim 1, wherein said optical sensor unit has first and second position-detecting elements which are used for detecting said second position-information, and has a third position-detecting element which is used for detecting said first position-information; and said slit light-source unit has a first slit light-source which faces said first position-detecting element in a third direction being parallel to said optical axis and crosses said first position-detecting element when viewed from said third direction, a second slit light-source which faces said second position-detecting element in said third direction and crosses said second position-detecting element when viewed from said third direction, and a third slit light-source which faces said third position-detecting element in said third direction and crosses said third position-detecting element when viewed from said third direction.

3. The anti-shake apparatus according to claim 2, wherein said movable unit has said slit light-source unit;

said fixed unit has said optical sensor unit;

said first and second position-detecting elements have linear-shaped receiving surfaces which are parallel to said second direction; and said third position-detecting element has a linear-shaped receiving surface which is parallel to said first direction.

4. The anti-shake apparatus according to claim 3, wherein said first and second slit light-sources are arranged in a symmetric position centering on one of said imaging device and said hand-shake correcting lens which is included in said movable unit.

5. The anti-shake apparatus according to claim 2, wherein said optical sensor unit has a fourth position-detecting element which is used for detecting said first position-information;

said slit light-source unit has a fourth slit light-source which faces said fourth position-detecting element in said third direction, and crosses said fourth position-detecting element when viewed from said third direction.

6. The anti-shake apparatus according to claim 5, wherein said movable unit has said slit light-source unit;

said fixed unit has said optical sensor unit;

said first and second position-detecting elements have linear-shaped receiving surfaces which are parallel to said second direction; and said third and fourth position-detecting elements have linear-shaped receiving surfaces which are parallel to said first direction.

7. The anti-shake apparatus according to claim 6, wherein said first and second slit light-sources are arranged in a symmetric position centering on one of said imaging device and said hand-shake correcting lens which is included in said movable unit; and said third and fourth slit light-sources are arranged in a symmetric position centering on one of said imaging device and said hand-shake correcting lens which is included in said movable unit.

8. The anti-shake apparatus according to claim 1, further comprising an urging member that urges said movable unit in a third direction which is parallel to said optical axis where said movable unit is movable and rotatable on said plane;

said movable unit having three or more balls;

said fixed unit having three or more ball bearings that contact with said balls; and a number of said balls being the same as a number of said ball bearings.

9. The anti-shake apparatus according to claim 1, wherein said movable unit and said fixed unit have a moving apparatus that moves and rotates said movable unit;

a number of points on said movable unit that receive a first force in one of said first direction and said second direction by said moving apparatus, is equal to or more than 1; and a number of points on said movable unit that receive a second force in another said first direction and said second direction by said moving apparatus, is equal to or more than 2.

10. The anti-shake apparatus according to claim 9, wherein one of said movable unit and said fixed unit has a coil unit that has one or more coils which are used for moving said movable unit in one of said first and second directions as said moving apparatus, and has two or more coils which are used for moving said movable unit in another of said first and second directions and for rotating said movable unit as said moving apparatus; and another of said movable unit and said fixed unit has a driving magnet unit that has said one or more magnets which are used for moving said movable unit in one of said first and second directions as said moving apparatus, and has said two or more magnets which are used for moving said movable unit in another of said first and second directions and for rotating said movable unit as said moving apparatus;

a number of said coils which are used for moving said movable unit in one of said first and second directions is the same as a number of said driving magnets which are used for moving said movable unit in one of said first and second directions; and a number of said coils which are used for moving said movable unit in another of said first and second directions and for rotating said movable unit is the same as a number of said driving magnets which are used for moving said movable unit in another of said first and second directions and for rotating said movable unit.

11. The anti-shake apparatus according to claim 1, wherein a location of said movable unit, which includes a rotation angle component of said movable unit, is specified on the basis of output signals of said one or more position-detecting elements which are used for detecting said first position-information, and on the basis of output signals of said two or more position-detecting elements which are used for detecting said second position-information.

12. The anti-shake apparatus according to claim 1 wherein said optical sensor unit is a position sensitive detector.

13. An anti-shake apparatus of a photographing apparatus, comprising:

a movable unit that has one of an imaging device and a hand-shake correcting lens and that can be moved and rotated on a plane which is perpendicular to an optical axis of a camera lens of said photographing apparatus; and a fixed unit that supports said movable unit in a movable and rotatable situation on said plane;

said movable unit and said fixed unit having a position-detecting apparatus that detects first position-information of said movable unit in a first direction being perpendicular to said optical axis;

one of said movable unit and said fixed unit having an optical sensor unit that has two or more position-detecting elements which are used for detecting said first position-information as said position-detecting apparatus;

another of said movable unit and said fixed unit having a slit light-source unit that has two or more slit light-sources which are used for detecting said first position-information, as said position-detecting apparatus; and a number of said position-detecting elements which are used for detecting said first position-information being the same as a number of said slit light-sources which are used for detecting said first position-information.

* * * * *